US010942573B2

United States Patent
Yamano et al.

(10) Patent No.: US 10,942,573 B2
(45) Date of Patent: Mar. 9, 2021

(54) INFORMATION PROCESSING DEVICE, METHOD, AND COMPUTER

(71) Applicant: SONY CORPORATION, Tokyo (JP)

(72) Inventors: Ikuo Yamano, Tokyo (JP); Osamu Ito, Tokyo (JP); Yosuke Matsuzaki, Kanagawa (JP); Ryo Yokoyama, Tokyo (JP); Shinsaku Hirano, Kanagawa (JP); Yusuke Nakagawa, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/419,463

(22) Filed: May 22, 2019

(65) Prior Publication Data

US 2019/0272038 A1 Sep. 5, 2019

Related U.S. Application Data

(63) Continuation of application No. 15/743,874, filed as application No. PCT/JP2016/076531 on Sep. 8, 2016, (Continued)

(51) Int. Cl.
*G06F 3/01* (2006.01)
*A63F 13/24* (2014.01)
(Continued)

(52) U.S. Cl.
CPC .............. *G06F 3/016* (2013.01); *A41D 1/002* (2013.01); *A41D 1/02* (2013.01); *A63F 13/211* (2014.09);
(Continued)

(58) Field of Classification Search
CPC .......... G06F 3/016; G06F 3/011; G06F 3/014; G06F 3/0487; A63F 13/211;
(Continued)

(56) References Cited

U.S. PATENT DOCUMENTS 8,279,193 B1 10/2012 Birnbaum et al.
10,379,614 B2 * 8/2019 Grant ...................... G06F 3/014
(Continued)

FOREIGN PATENT DOCUMENTS

CN 103181180 A 6/2013
CN 104049795 A 9/2014
(Continued)

OTHER PUBLICATIONS

Mar. 8, 2019, European Search Report issued for related EP Application No. 16844261.4.
(Continued)

*Primary Examiner* — Munear T Akki
(74) *Attorney, Agent, or Firm* — Paratus Law Group, PLLC

(57) ABSTRACT

There is provided an information processing device to cause vibration to be generated suitable for a state between an information processing device including a vibrating device and a user, the information processing device including: corrected vibration data configured to generate corrected information for correcting a strength of vibration data for a vibrating device including a vibrator on a basis of information provided from a detecting unit configured to detect a contact state of the vibrating device; and an vibration signal generating unit configured to generate a vibration signal from the corrected vibration data.

8 Claims, 26 Drawing Sheets

Related U.S. Application Data now Pat. No. 10,353,470, which is a continuation-in-part of application No. PCT/JP2016/075581, filed on Aug. 31, 2016.

(60) Provisional application No. 62/215,572, filed on Sep. 8, 2015.

(51) Int. Cl.

| | |
|---|---|
| *A63F 13/218* | (2014.01) |
| *H04M 19/04* | (2006.01) |
| *A63F 13/211* | (2014.01) |
| *A63F 13/212* | (2014.01) |
| *A63F 13/215* | (2014.01) |
| *A63F 13/235* | (2014.01) |
| *A63F 13/285* | (2014.01) |
| *A63F 13/31* | (2014.01) |
| *A63F 13/428* | (2014.01) |
| *A63F 13/54* | (2014.01) |
| *A63F 13/577* | (2014.01) |
| *A63F 13/92* | (2014.01) |
| *A41D 1/00* | (2018.01) |
| *A41D 1/02* | (2006.01) |
| *G02B 27/01* | (2006.01) |
| *A63F 13/426* | (2014.01) |
| *G06F 3/0487* | (2013.01) |

(52) U.S. Cl.
CPC .......... *A63F 13/212* (2014.09); *A63F 13/215* (2014.09); *A63F 13/218* (2014.09); *A63F 13/235* (2014.09); *A63F 13/24* (2014.09); *A63F 13/285* (2014.09); *A63F 13/31* (2014.09); *A63F 13/428* (2014.09); *A63F 13/54* (2014.09); *A63F 13/577* (2014.09); *A63F 13/92* (2014.09); *G02B 27/0172* (2013.01); *G06F 3/011* (2013.01); *G06F 3/014* (2013.01); *H04M 19/04* (2013.01); *A63F 13/426* (2014.09); *A63F 2250/166* (2013.01); *A63F 2300/308* (2013.01); *G02B 2027/014* (2013.01); *G06F 3/0487* (2013.01)

(58) Field of Classification Search
CPC .... A63F 13/212; A63F 13/215; A63F 13/218; A63F 13/235; A63F 13/24; A63F 13/285; A63F 13/31; A63F 13/428; A63F 13/54; A63F 13/577; A63F 13/92; A63F 13/426; A63F 2250/166; A63F 2300/308; A41D 1/002; A41D 1/02; G02B 27/0172; G02B 2027/014; H04M 19/04
See application file for complete search history.

(56) References Cited

U.S. PATENT DOCUMENTS

| | | | |
|---|---|---|---|
| 10,569,167 B1* | 2/2020 | Hotaki | A63F 13/285 |
| 2003/0112281 A1 | 6/2003 | Sriram et al. | |
| 2007/0203435 A1 | 8/2007 | Novak | |
| 2011/0018697 A1 | 1/2011 | Birnbaum | |
| 2012/0126962 A1 | 5/2012 | Ujii et al. | |
| 2012/0190460 A1* | 7/2012 | Sessions | A63F 13/02 463/47 |
| 2013/0038603 A1 | 2/2013 | Bae | |
| 2013/0181841 A1* | 7/2013 | Iizuka | A61B 5/4836 340/575 |
| 2014/0070957 A1* | 3/2014 | Longinotti-Buitoni | G06F 3/011 340/870.01 |
| 2014/0265650 A1 | 9/2014 | Jeon | |
| 2014/0267065 A1* | 9/2014 | Levesque | G06F 3/0488 345/173 |
| 2014/0281958 A1 | 9/2014 | Birnbaum et al. | |
| 2015/0026647 A1* | 1/2015 | Park | G06F 3/0488 715/863 |
| 2015/0105129 A1* | 4/2015 | Chapman | A63F 13/212 463/7 |
| 2015/0332659 A1* | 11/2015 | Ebeling | G08B 6/00 84/645 |
| 2017/0116869 A1 | 4/2017 | Pape | |
| 2017/0277330 A1* | 9/2017 | Bae | G06F 3/01 |
| 2018/0314330 A1* | 11/2018 | Ryu | G06F 3/016 |
| 2019/0155388 A1* | 5/2019 | Lee | G06F 3/016 |
| 2019/0196596 A1* | 6/2019 | Yokoyama | A63F 13/25 |

FOREIGN PATENT DOCUMENTS

| | | |
|---|---|---|
| EP | 1928162 A1 | 6/2008 |
| EP | 2293532 A1 | 3/2011 |
| EP | 2988200 A1 | 2/2016 |
| EP | 3483701 A1 | 5/2019 |
| JP | H11-085400 A | 3/1999 |
| JP | 2005-301827 A | 10/2005 |
| JP | 2008-134990 A | 6/2008 |
| JP | 2012-187148 A | 10/2012 |
| JP | 2013-500516 A | 1/2013 |
| JP | 2013-054645 A | 3/2013 |
| JP | 2013-150201 A | 8/2013 |
| JP | 2013-187148 A | 9/2013 |
| JP | 2014-179088 A | 9/2014 |
| JP | 2015-062115 A | 4/2015 |
| JP | 2016-025620 A | 2/2016 |
| WO | WO 2011/041535 A1 | 4/2011 |
| WO | WO 2013/018267 A1 | 2/2013 |

OTHER PUBLICATIONS

Mar. 13, 2019, European Search Report issued for related EP Application No. 16844471.9.
Jun. 29, 2020, European Search Report issued for related EP application No. 20166761.5.

* cited by examiner

FIG. 15

| CORRECTION INFORMATION | WRIST | UPPER ARM | CHEST | LOWER ABDOMEN | LOWER LEG |
|---|---|---|---|---|---|
| | 1 | 2 | 2 | 3 | 3 |

INFORMATION PROCESSING DEVICE, METHOD, AND COMPUTER

CROSS REFERENCE TO PRIOR APPLICATION

This application is a continuation of U.S. patent application Ser. No. 15/743,874 (filed on Jan. 11, 2018), which is a National Stage Patent Application of PCT International Patent Application No. PCT/JP2016/076531 (filed on Sep. 8, 2016) under 35 U.S.C. § 371, which is a continuation-in-part of PCT International Patent Application No. PCT/JP2016/075581 (filed on Aug. 31, 2016), which claims priority to U.S. Provisional Patent Application No. 62/215,572 (filed on Sep. 8, 2015), which are all hereby incorporated by reference in their entirety.

TECHNICAL FIELD

The present disclosure relates to an information processing device, a method, and a computer program.

BACKGROUND ART

Currently, information processing devices that execute applications such as smartphones or wearable terminals worn on wrist or the like have been spread. In such information processing devices, a notification from an application may be performed by a sound or vibration.

An information processing device in which a notification from an application is performed by a sound or vibration as described above is disclosed in Patent Literature 1. A client device disclosed in Patent Literature 1 is a terminal including an imaging unit, and a notification is given to the user by vibration.

CITATION LIST

Patent Literature

Patent Literature 1: JP 2016-25620A

DISCLOSURE OF INVENTION

Technical Problem

However, since a sensitivity that a person feels vibration varies depending on a contact state between an information processing device including a vibrating device and a user, it is preferable to correct vibration data in order to keep an experience strength at which the user feels vibration constant. In this regard, the present disclosure proposes an information processing device, a method, and a computer program which are capable of correcting the vibration data in accordance with the contact state between the information processing device and the user.

Solution to Problem

According to the present disclosure, there is provided an information processing device, including: a corrected vibration data generating unit configured to generate corrected vibration data obtained by correcting a strength of vibration data for a vibrating device including a vibrator on a basis of information provided from a detecting unit configured to detect a contact state of the vibrating device; and an vibration signal generating unit configured to generate a vibration signal from the corrected vibration data.

Further, according to the present disclosure, there is provided a method, including: generating, by a processor, corrected vibration data obtained by correcting a strength of vibration data for a vibrating device including a vibrator on a basis of information provided from a detecting unit configured to detect a contact state of the vibrating device; and generating, by the processor, a vibration signal on a basis of the corrected vibration data.

Further, according to the present disclosure, there is provided a computer program causing a processor to generate corrected vibration data obtained by correcting a strength of vibration data for a vibrating device including a vibrator on a basis of information provided from a detecting unit configured to detect a contact state of the vibrating device, and generate a vibration signal on a basis of the corrected vibration data.

Advantageous Effects of Invention

As described above, according to the present disclosure, it is possible to cause vibration to be generated suitable for a state between the information processing device including the vibrating device and the user.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 15 is a table illustrating a relation between correction information stored in a storage unit of a wearable terminal and a part in an embodiment of the present disclosure.

MODE(S) FOR CARRYING OUT THE INVENTION

Figure 1:
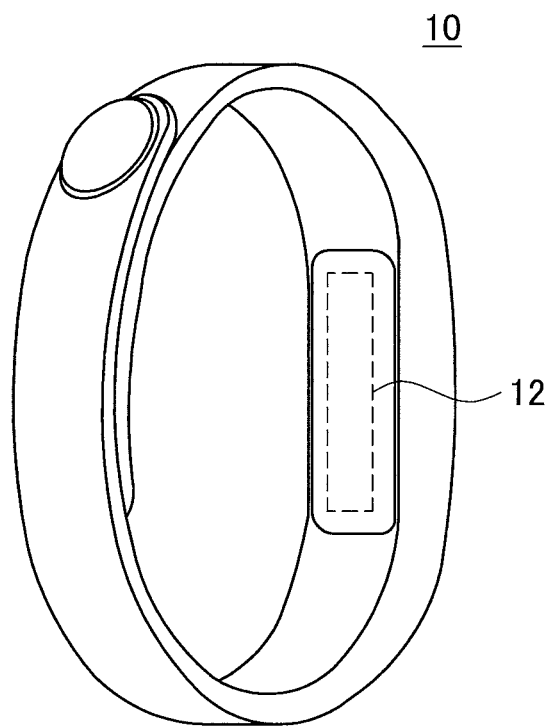
FIG. 1 is a diagram illustrating an example of a wristband type wearable terminal.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Further, the description will proceed in the following order.
0. Background
1. Example in Which vibration data is corrected in accordance with pressing pressure
1-1. Wristband type wearable terminal
1-2. Jacket type wearable terminal
2. Example in which vibration data is corrected in accordance with wearing position
2-1. Example in which strength of vibration data is corrected in accordance with wearing position
2-2. Example in which frequency of vibration data is corrected in accordance with wearing position
3. Structure of vibrating device
4. Feedback caused by non-contact event on virtual manipulation object
5. Feedback of vibration based on shape and material of virtual object
6. Application example of feedback
7. Supplement
8. Conclusion

0. Background

First, a background of the present disclosure will be described. FIG. 1 is an example of a wearable terminal 10 which is contrasted with an information disclosure device of the present disclosure. The wearable terminal 10 illustrated in FIG. 1 is a wristband type, and the wearable terminal 10 is worn such that a band is wound around the arm or the like of the user.

Further, for example, the wearable terminal 10 illustrated in FIG. 1 may have a function of a pedometer and gives a notification indicating that a predetermined number of steps is reached to the user by the vibration. Therefore, the wearable terminal 10 internally includes a vibrating device 12 that gives vibration to the user.

The user may receive a notification given through vibration from the wearable terminal 10. Further, in a form of a terminal such as the wearable terminal 10, the contact state between the user and the wearable terminal 10 changes in accordance with a use scene. For example, the wearable terminal 10 is strongly pressed against the user when the band is strongly wound and is loosely pressed against the user when the band is loosely wound. Accordingly, the vibrating device 12 of the wearable terminal 10 is strongly or loosely pressed against the user. At this rime, a vibration experience sensitivity of the user differs depending on a pressing pressure at which the vibrating device 12 is pressed against the user.

Figure 2:
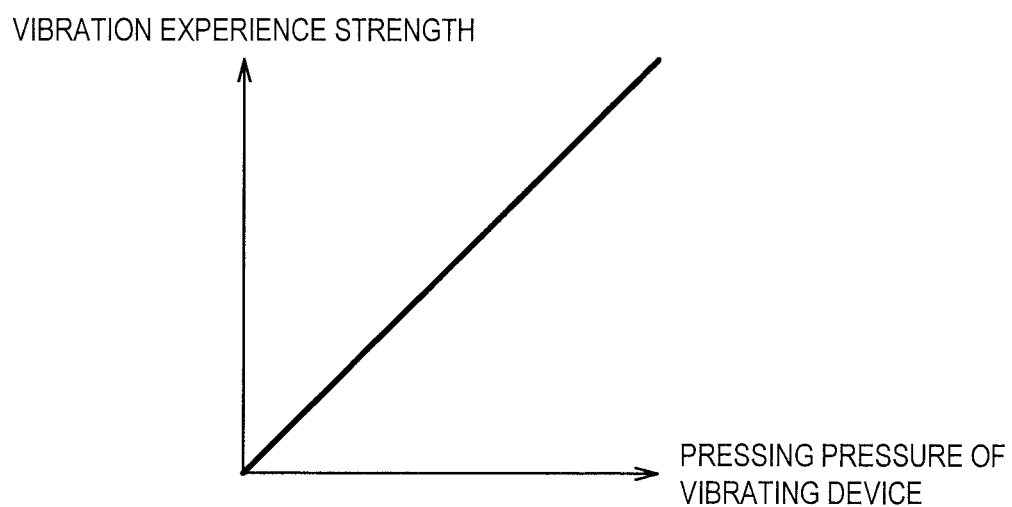
FIG. 2 is a diagram illustrating an example of a relation between an experience sensitivity of a person regarding vibration and a pressing pressure of a vibrating device against a person.

FIG. 2 is a diagram illustrating an example of a relation between an experience sensitivity of a person regarding vibration and a pressing pressure of a vibrating device against a person. As can be seen from FIG. 2, as the pressing pressure of the vibrating device 12 increases, a vibration experience strength of a person increases. Thus, although the same magnitude of vibration occurs, if the wearable terminal 10 is strongly worn on the user as the band is tightened tightly, the user feels strong vibration. On the other hand, if the wearable terminal 10 is loosely worn on a person as the band is loosely tightened, the user feels weak vibration.

Further, there are cases in which the relation between the pressing pressure of the vibrating device 12 against the person and the vibration experience strength is not a proportional relation illustrated in FIG. 2. For example, in a case in which the pressing pressure of the vibrating device 12 becomes extremely large, the vibration of the vibrating device 12 is restricted by the contact surface between the vibrating device 12 and the person. For this reason, the vibration generated from the vibrating device 12 is weakened, and the vibration experience strength is weakened accordingly, unlike the example illustrated in FIG. 2.

As described above, even though the vibrating device 12 is vibrating with the same physical vibration strength, the vibration experience strength actually felt by the user differs depending on the pressing pressure of the vibrating device 12. Therefore, in the information processing device according to the present disclosure, the vibration data is corrected in order to keep the vibration experience strength to be constant in view of a difference in the pressing pressure of the vibrating device 12 against the body of the user.

1. Example in which Vibration Data is Corrected in Accordance with Pressing Pressure <1-1. Wristband Type Wearable Terminal>

Figure 3:
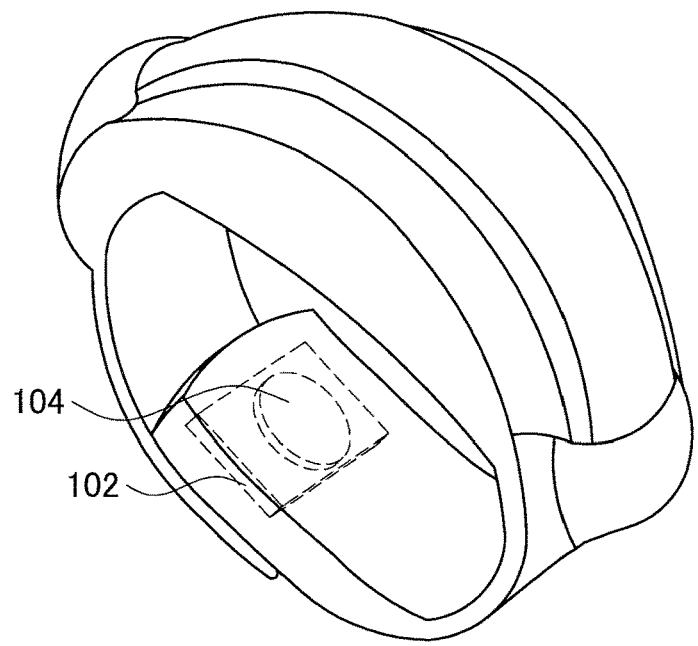
FIG. 3 is a diagram illustrating an example of an external appearance of a wristband type wearable terminal in an embodiment of the present disclosure.

The background of the present disclosure has been described above. A wearable terminal 100 which is an example of the information processing device according to the present embodiment will be described below. FIG. 3 is a diagram illustrating an example of an external appearance of the wristband type wearable terminal 100 according to the present embodiment.

The wristband type wearable terminal 100 is worn such that the band is wound around the arm or the like of the user. For example, the wristband type wearable terminal 100 may have a function of a pedometer, and, for example, the wristband type wearable terminal 100 includes a vibrating device 102 that gives a notification indicating that a predetermined number of steps is reached to the user by vibration. Further, the wristband type wearable terminal 100 includes a pressure sensor 104 that detects the contact state between the vibrating device 102 and the arm of the user. The pressure sensor 104 detects how strongly the wearable terminal 100 is pressed against the user by detecting the pressure, that is, how strongly the vibrating device 102 is pressed against the user. Further, in the following description, detection of the contact state between the wearable terminal 100 and the user by the pressure sensor 104 is described as being synonymous with detection of the contact state between the vibrating device 102 and the user. Further, the pressure sensor 104 is an example of a detecting unit that detects the contact state of the vibrating device 102.

Note that the vibrating device 102 may be a device equipped with a vibrator such as an eccentric motor with a shape-biased weight attached to a rotation axis of a motor. Further, the vibrating device 102 may be a device equipped with a vibrator such as a voice coil motor, a piezo actuator, or an electromagnetic linear actuator.

Further, the pressure sensor 104 may be a sensor equipped with a pressure sensitive element which converts pressure into an electric signal such as a piezo element or may be a sensor which is equipped with a capacitor whose capacitance changes in accordance with pressure and converts a change in capacitance to an electric signal. Further, the pressure sensor 104 may be a film type pressure sensor 104.

Figure 4:
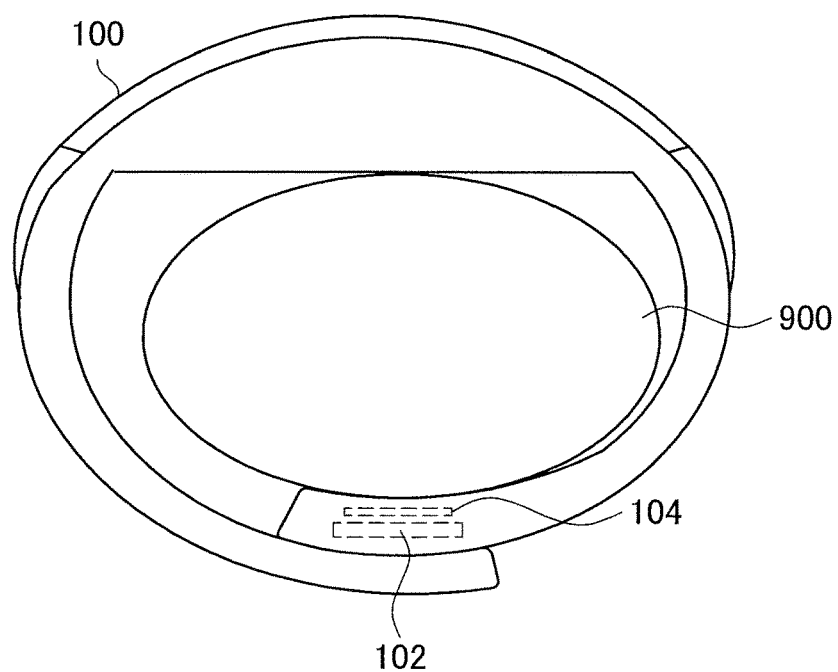
FIG. 4 is a cross-sectional view illustrating a state in which a wristband type wearable terminal according to an embodiment of the present disclosure is wont.

FIG. 4 is a cross-sectional view when the wearable terminal 100 is worn on an arm 900 of the user. The wearable terminal 100 is worn such that the band is wound around the arm 900 of the user. Further, the pressure sensor 104 is preferably placed between the vibrating device 102 and the arm 900 of the user when the wearable terminal 100 is worn on the arm 900 of the user as illustrated in FIG. 4. This is because it is preferable that the pressing pressure of the vibrating device 102 against the user be measured at a position close to the contact position between the vibrating device 102 and the arm 900 of the user. In other words, since a part of the arm 900 of the user having a small distance to the vibrating device 102 most strongly senses the vibration of the vibrating device 102, the pressure sensor 104 is preferably placed between the vibrating device 102 and the arm 900 of the user.

The external appearance of the wearable terminal 100 according to the present embodiment and the position relation between the pressure sensor 104 and the vibrating device 102 when the wearable terminal 100 is worn on the user have been described above. An internal configuration of the wearable terminal 100 according to the present embodiment will be described below.

Figure 5:
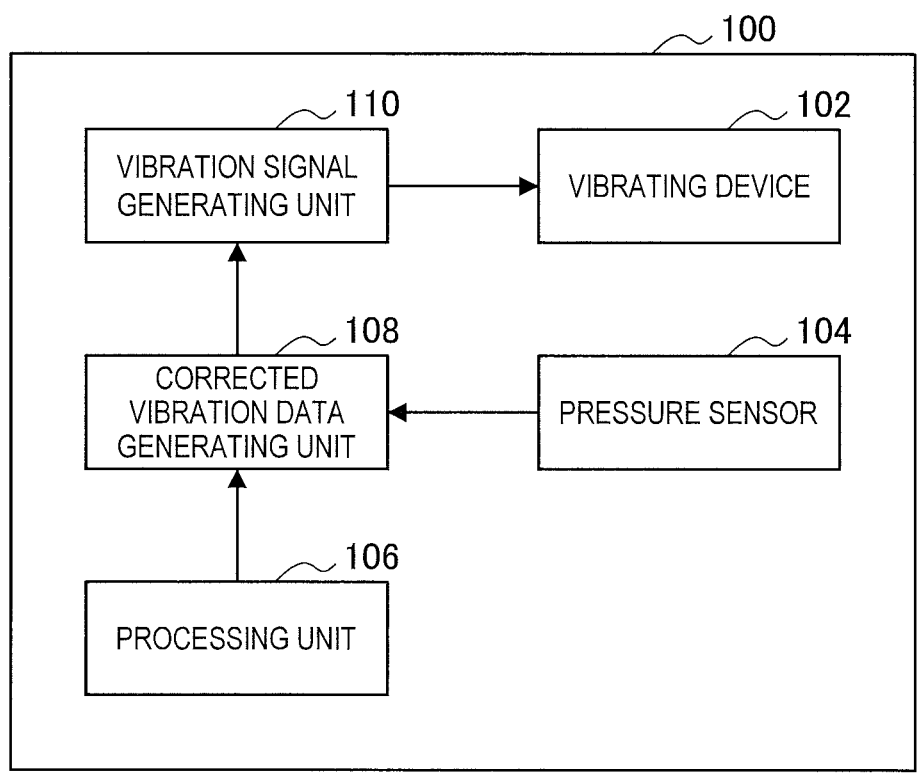
FIG. 5 is a block diagram illustrating a configuration of a wristband type wearable terminal according to an embodiment of the present disclosure.

FIG. 5 is a block diagram illustrating an internal configuration of the wearable terminal 100 according to the present embodiment. The wearable terminal 100 further includes a processing unit 106, a corrected vibration data generating unit 108, and a vibration signal generating unit 110. The processing unit 106 performs a process associated with an application of the wearable terminal 100. The application processed by the processing unit 106 is, for example, an application having a function of a pedometer. Further, the processing unit 106 generates the vibration data for the vibrating device 102 on the basis of an instruction given from the application. For example, the processing unit 106 may generate the vibration data when the counted number of steps reaches a predetermined number of steps.

The corrected vibration data generating unit 108 generates corrected vibration data obtained by correcting the strength of the vibration data for the vibrating device 102 generated by the processing unit 106 on the basis of the information provided from the pressure sensor 104. As described above, a person feels strong vibration if the pressing pressure of the vibrating device 102 increases. Therefore, the corrected vibration data generating unit 108 generates corrected vibration data which strengthens the strength of the vibration data in a case in which the pressure detected by the pressure sensor 104 is low and corrected vibration data which weakens the strength of the vibration data in a case in which the pressure detected by the pressure sensor 104 is high. For example, the corrected vibration data generating unit 108 may generate the corrected vibration data by multiplying the vibration data by a reciprocal of a value of the vibration experience sensitivity illustrated in FIG. 2 as a coefficient. When the corrected vibration data is generated as described above, it is possible to perform control such that a sensory strength at which the user feels the vibration is constant.

The vibration signal generating unit 110 generates a vibration signal for driving the vibrating device 102 on the basis of the corrected vibration data generated by the corrected vibration data generating unit 108. For example, the vibration signal generating unit 110 performs D/A conversion or the like on the corrected vibration data and generates the vibration signal which is an analog signal.

Figure 6:
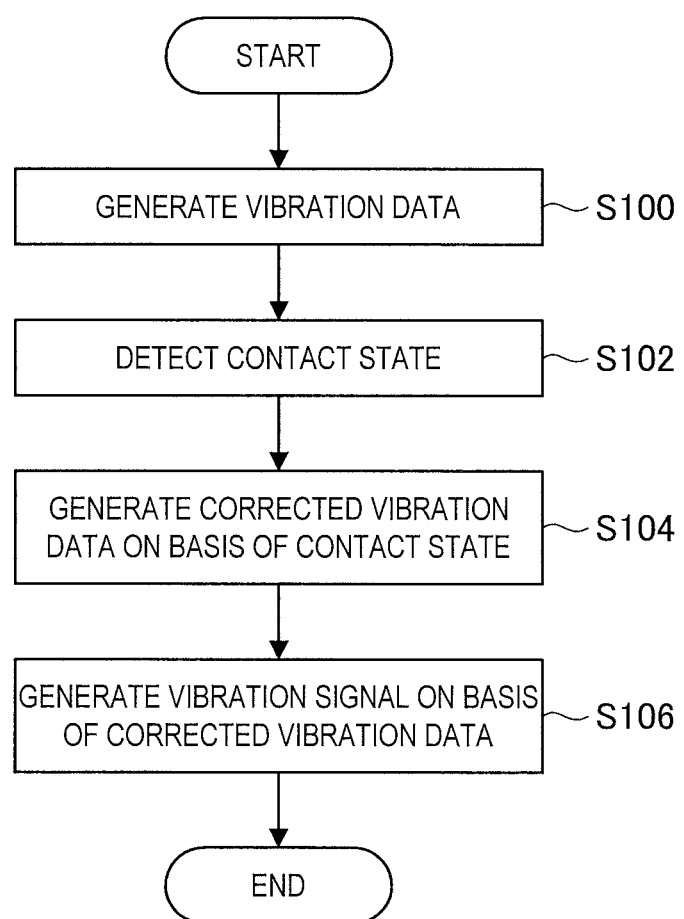
FIG. 6 is a flowchart illustrating an example of a process performed in a wristband type wearable terminal in an embodiment of the present disclosure.

The configuration of the wristband type wearable terminal 100 has been described above. A process performed in the wristband type wearable terminal 100 will be described below. FIG. 6 is a flowchart illustrating a process performed in the wristband type wearable terminal 100.

First, in S100, the processing unit 106 generates the vibration data for driving the vibrating device 102 on the basis of an instruction given from the application. For example, the processing unit 106 may generate the vibration data to give a notification indicating that the number of steps reaches a predetermined number of steps in an application having a function of a pedometer.

Then, in S102, the pressure sensor 104 detects the pressure and detects the contact state between the wearable terminal 100 and the user. Then, the pressure sensor 104 transmits information related to the detected pressure to the corrected vibration data generating unit 108.

Then, in S104, the corrected vibration data generating unit 108 generates the corrected vibration data on the basis of the vibration data received from the processing unit 106 and the information related to the pressure received from the pressure sensor 104. The corrected vibration data generating unit 108 generates the corrected vibration data which strengthens the strength of the vibration data in a case in which the pressure detected by the pressure sensor 104 is low and generates the corrected vibration data which weakens the strength of the vibration data in a case in which the pressure detected by the pressure sensor 104 is high.

Then, the vibration signal generating unit 110 receives the corrected vibration data from the corrected vibration data generating unit 108, performs a process such as D/A conversion, and generates the vibration signal. Further, the vibrating device 102 vibrates on the basis of the vibration signal generated by the vibration signal generating unit 110.

As described above, since the vibrating device 102 vibrates on the basis of the corrected vibration data which is corrected on the basis of the information related to the pressure detected by the pressure sensor 104, the vibration causing the user to have the same sensory strength is generated regardless of the contact state of the wearable terminal 100.

<1-2. Jacket Type Wearable Terminal>

Figure 7:
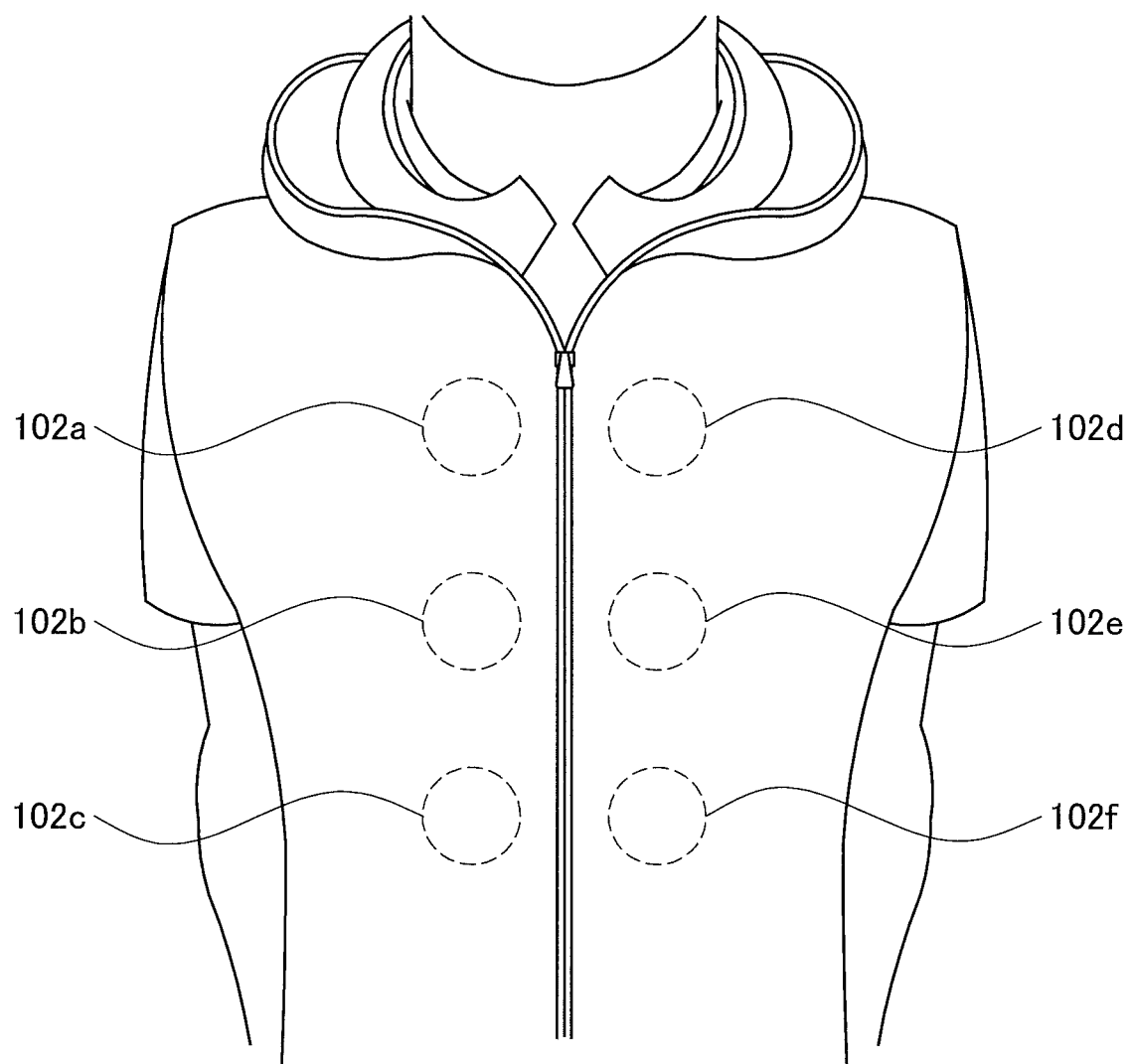
FIG. 7 is a diagram illustrating an example of an external appearance of a jacket type wearable terminal according to an embodiment of the present disclosure.

The configuration of the wristband type wearable terminal 100 has been described above. A jacket type wearable terminal 100 will be described below. FIG. 7 is a diagram illustrating an example of an external appearance of the jacket type wearable terminal 100. For example, the jacket type wearable terminal 100 may be used to feed the vibration generated in the game software or the like back to the user.

Further, the jacket type wearable terminal 100 may include a plurality of vibrating devices 102*a* to 102*f*. Further, a plurality of vibrating devices 102*a* to 102*f* may be placed to be bilaterally symmetric as illustrated in FIG. 7. Further, a plurality of vibrating devices 102*a* to 102*f* may be placed such that the vibrating devices 102*a* and 102*d* are placed on the chest, the vibrating devices 102*b* and 102*e* are placed on the upper abdomen, and the vibrating devices 102*c* and 102*f* are placed on the lower abdomen as illustrated in FIG. 7.

Figure 8:
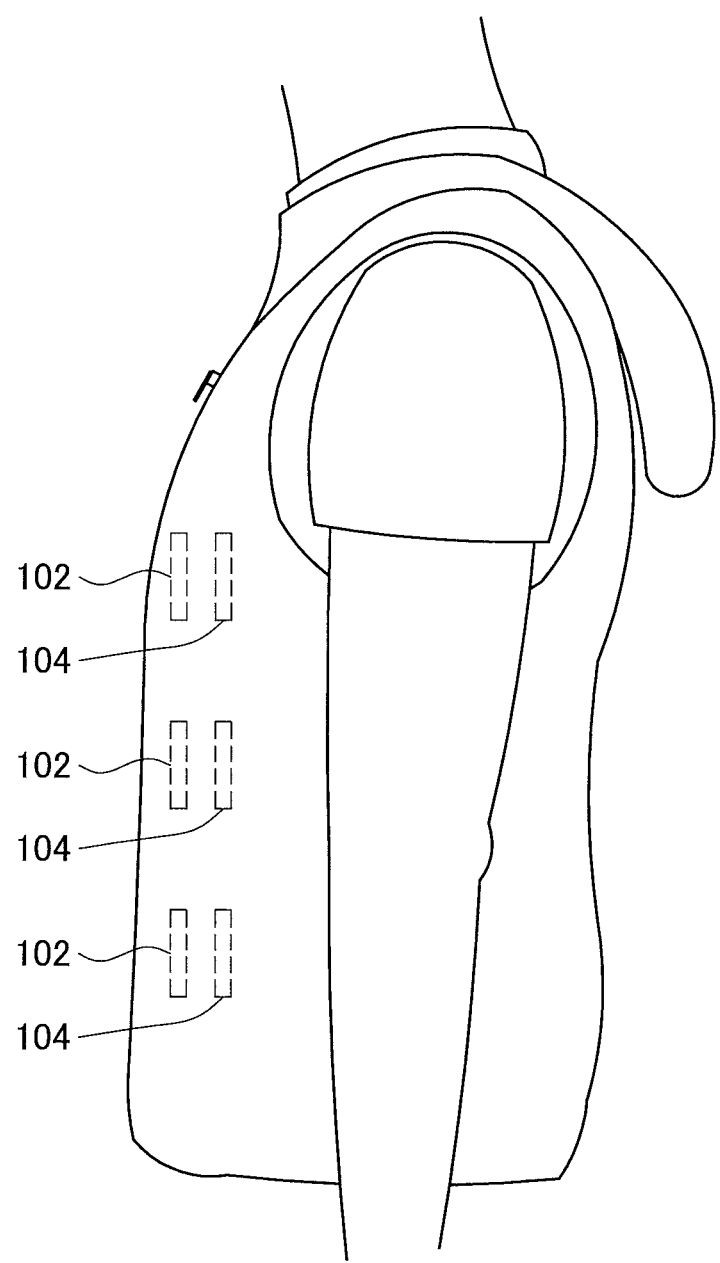
FIG. 8 is a diagram illustrating a position relation between a vibrating device and a pressure sensor of a jacket type wearable terminal according to an embodiment of the present disclosure.

FIG. 8 is a side view illustrating a wearing state when the jacket type wearable terminal 100 illustrated in FIG. 7 is worn on the user. As illustrated in FIG. 8, similarly to the wristband type wearable terminal 100, the jacket type wearable terminal 100 includes a pressure sensor 104 that detects the contact state between the vibrating device 102 and the user. The pressure sensor 104 detects the pressure and detects how strongly the vibrating device 102 is pressed against the user. Further, the pressure sensor 104 is preferably placed between the vibrating device 102 and the user when the wearable terminal 100 is worn on the user as illustrated in FIG. 8.

Figure 9:
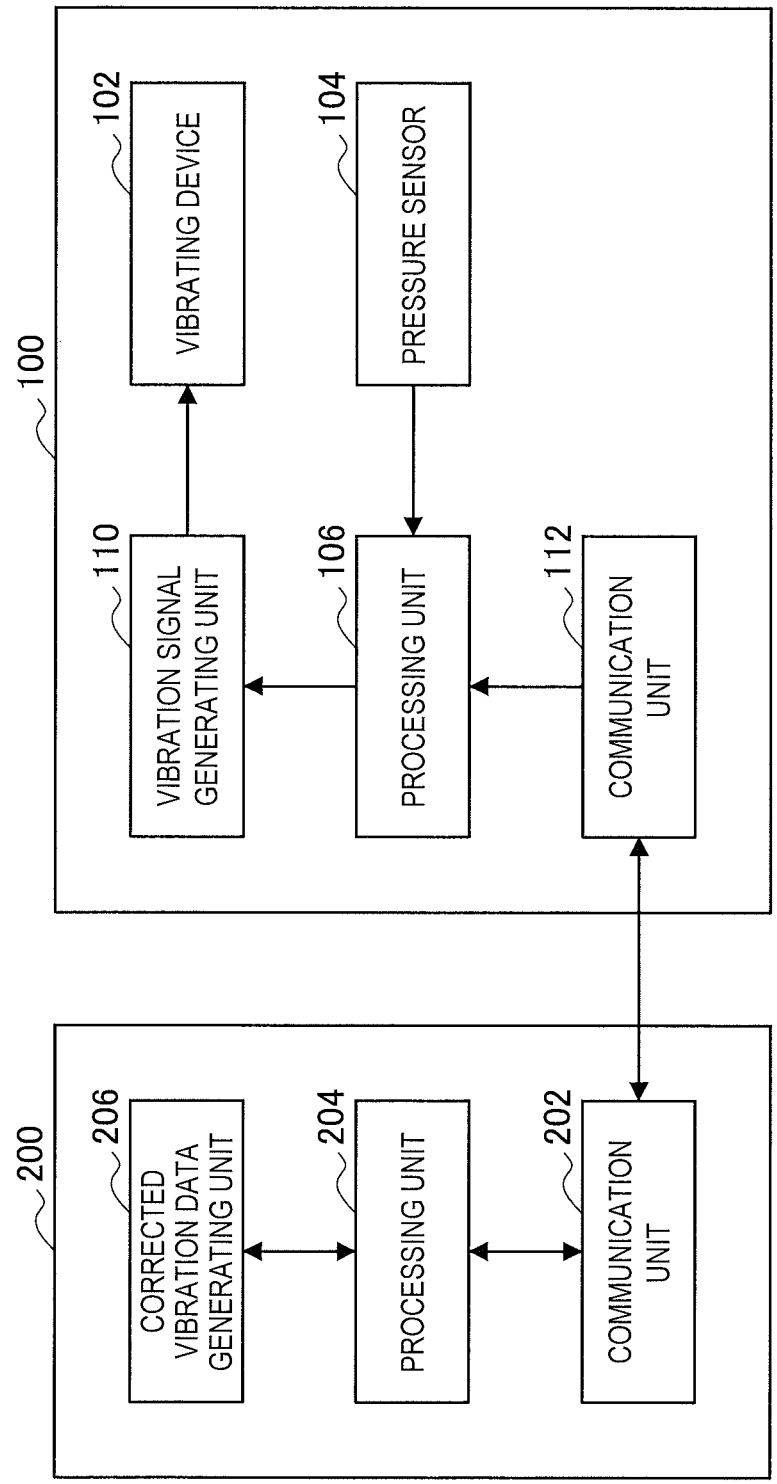
FIG. 9 is a block diagram illustrating an example of a configuration of a jacket type wearable terminal according to an embodiment of the present disclosure.

FIG. 9 is a block diagram illustrating an example of a configuration of the jacket type wearable terminal 100. As described above, the jacket type wearable terminal 100 may be used to feed the vibration generated in the game software or the like back to the user. Thus, the jacket type wearable terminal 100 according to the present embodiment is connected to a game machine 200 and receives the corrected vibration data from the game machine 200.

Configurations of the game machine 200 and the jacket type wearable terminal 100 illustrated in FIG. 9 will be described below. Since the jacket type wearable terminal 100 illustrated in FIG. 9 receives the vibration data from the game machine 200, the jacket type wearable terminal 100 may not include the corrected vibration data generating unit 108, unlike the configuration of the wristband type wearable terminal 100 illustrated in FIG. 5. Therefore, as illustrated in FIG. 9, the jacket type wearable terminal 100 includes a communication unit 112 that receives the vibration data from the game machine 200.

Further, the wearable terminal 100 transmits information related to the pressure detected by the pressure sensor 104 to the game machine 200 via the communication unit 112. Further, the communication unit 112 may be a near field communication (NFC) interface such as Bluetooth (a registered trademark). Further, the communication unit 112 is not limited to the interface described above and may be an NFC interface such as ZigBee (a registered trademark).

Next, the configuration of the game machine 200 will be described. The game machine 200 includes a communication unit 202, a processing unit 204, and a corrected vibration data generating unit 206. The communication unit 202 is used to perform transmission and reception of information with the wearable terminal 100. The processing unit 204 executes a process associated with the game software. For example, the processing unit 204 may process information related to the virtual space based on the game software illustrated in FIG. 10.

Figure 10:
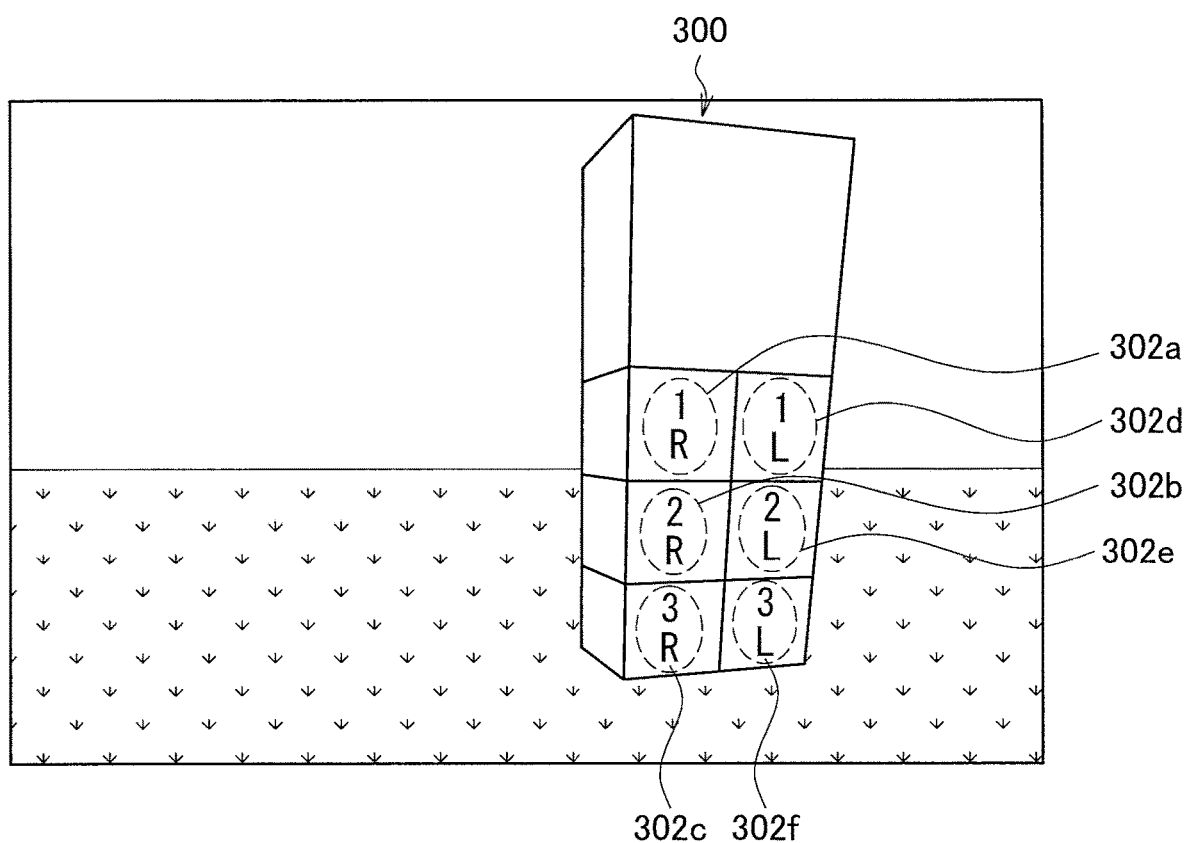
FIG. 10 is a diagram illustrating examples of a virtual object and a listener generated in game machine.

As illustrated in FIG. 10, a virtual object 300 is placed in the virtual space based on the game software, and listeners 302*a* to 302*f* that detect a contact with the virtual object 300 or an arrival of a sound at the virtual object 300 are placed in the virtual object 300. For example, in a case in which another virtual object 300 comes into contact with the listener 302*a* to 302*f* in the virtual space, the processing unit 204 generates the vibration data on the basis of information at the time of contact. Further, the listeners 302*a* to 302*f* correspond to the vibrating devices 102*a* to 102*f* of the jacket type wearable terminal 100, respectively. Thus, for example, when another virtual object 300 comes into contact with the listener 302*a*, the processing unit 204 generates the vibration data for causing the vibrating device 102*a* to vibrate.

Returning to the description of the configuration of the game machine 200, the corrected vibration data generating unit 206 of the game machine 200 generates the corrected vibration data obtained by correcting the vibration data generated by the processing unit 204 on the basis of the information detected by the pressure sensor 104 of the wearable terminal 100.

Figure 11:
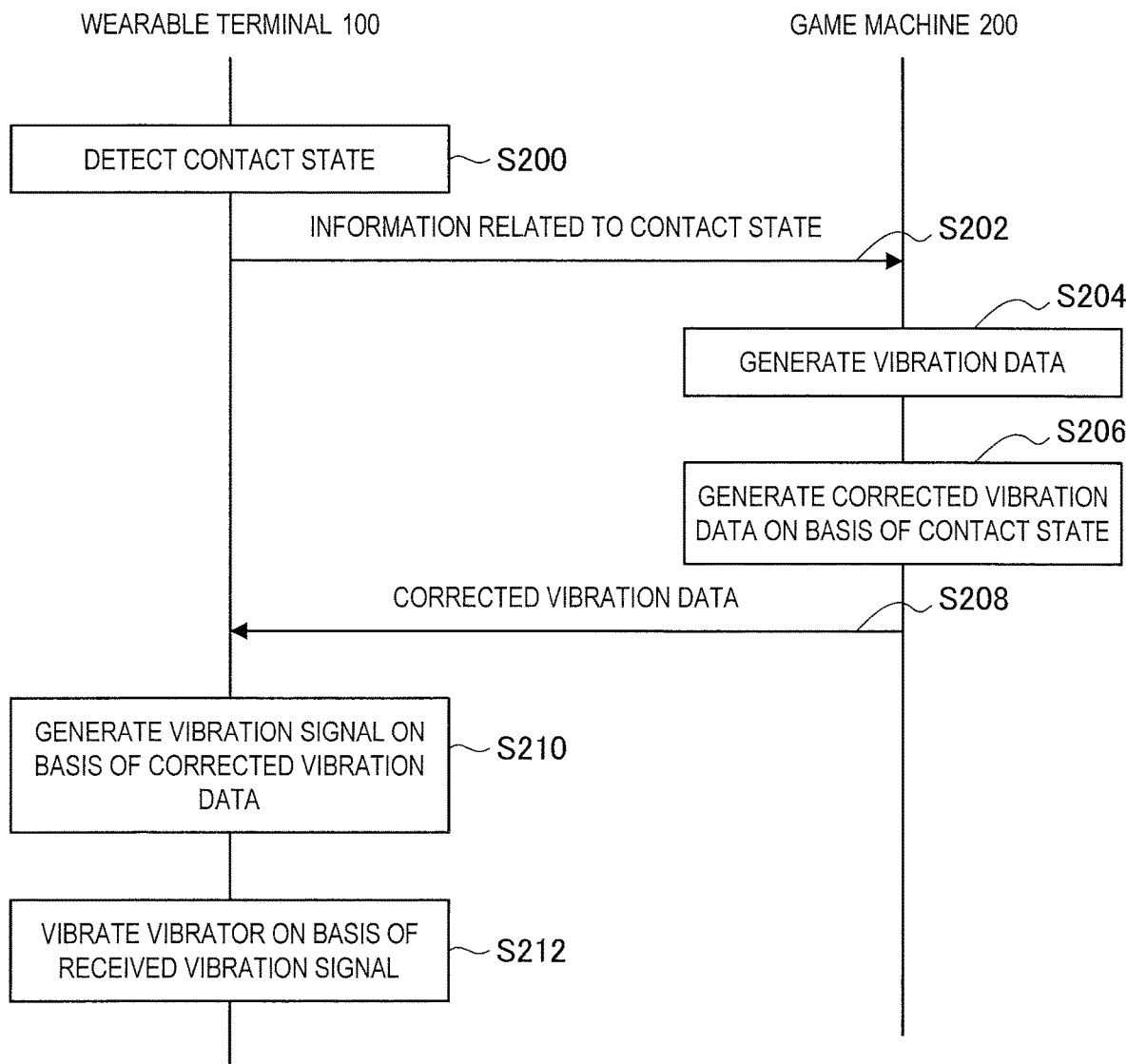
FIG. 11 is a flowchart illustrating an example of a process performed between a jacket type wearable terminal and a game machine in an embodiment of the present disclosure.

The configuration of the jacket type wearable terminal 100 and game machine 200 has been described above. A process performed in the jacket type wearable terminal 100 and the game machine 200 will be described below. FIG. 11 is a flowchart illustrating a process performed in the jacket type wearable terminal 100 and the game machine 200.

First, in S200, the pressure sensor 104 detects the pressure and detects the contact state between the wearable terminal 100 and the user. Then, the pressure sensor 104 transmits information related to the detected pressure to the processing unit 106. Then, in S202, the processing unit 106 transmits the information related to the pressure received from the pressure sensor 104 to the game machine 200 via the communication unit 112.

Then, in S204, the processing unit 204 of the game machine 200 generates the vibration data on the basis of an instruction given from the game software. The instruction given from the game software may be generated, for example, on the basis of the contact between another virtual object 300 and the listener 302*a*.

Then, in S206, the corrected vibration data generating unit 206 of the game machine 200 generates the corrected vibration data on the basis of the vibration data received from the processing unit 204 and the information received from the pressure sensor 104. At this time, in a case in which the vibration data for causing the vibrating device 102a to vibrate is generated by the processing unit 204, the corrected vibration data generating unit 206 of the game machine 200 generates the corrected vibration data on the basis of the information provided from the pressure sensor 104 that detects the contact state between the vibrating device 102a and the user.

Then, in S208, the processing unit 204 of the game machine 200 transmits the corrected vibration data generated by the corrected vibration data generating unit 206 to the wearable terminal 100 via the communication unit 202. Then, in S210, the vibration signal generating unit 110 performs a process such as D/A conversion on the corrected vibration data received from the game machine 200 and generates the vibration signal. Then, the vibrating device 102 vibrates on the basis of the vibration signal generated by the vibration signal generating unit 110 in S212.

As described above, the vibration data may be corrected by an information processing device other than the wearable terminal 100 such as the game machine 200. Further, since a plurality of pressure sensors 104 corresponding to a plurality of vibrating devices 102 are placed, the corrected vibration data is generated in accordance with the contact state between each vibrating device 102 and the user.

Further, in the above example, the pressure sensor 104 is used to detect the pressing pressure of the vibrating device 102 against the user. However, the detecting unit that detects the pressing pressure of the vibrating device 102 against the user is not limited to the pressure sensor 104. For example, the detecting unit that detects the pressing pressure of the vibrating device 102 against the user may be an acceleration sensor or a gyro sensor. Further, the acceleration sensor or the gyro sensor may detect secondary vibration occurring by the wearable terminal 100 not being pressed against the user, and the processing unit 106 may estimate the pressing pressure of the vibrating device 102 against the user on the basis of the secondary vibration detected by the acceleration sensor or the gyro sensor.

The secondary vibration detected by the acceleration sensor or the gyro sensor here is vibration occurring by the wearable terminal 100 being shaken in a state in which the wearable terminal 100 is not strongly worn on the user. For example, the secondary vibration is vibration detected by the user shaking his/her hand, and the wearable terminal 100 being shaken in a case in which the wearable terminal 100 is worn on the wrist.

Further, the corrected vibration data generating unit 108 may generate the corrected vibration data on the basis of the pressing pressure estimated by the processing unit 106 on the basis of the information detected by the acceleration sensor or the gyro sensor. For example, the corrected vibration data generating unit 108 generates corrected vibration data which strengthens the strength of the vibration data in a case in which the magnitude of the secondary vibration acceleration, an angular speed, or an angular acceleration detected by the acceleration sensor or the gyro sensor is large. Further, the corrected vibration data generating unit 108 may generate corrected vibration data which weakens the strength of the vibration data in a case in which the magnitude of the secondary vibration acceleration, an angular speed, or an angular acceleration detected by the acceleration sensor or the gyro sensor is small.

Further, although the wearable terminal 100 has been mainly described above, the process described above may be applied to information processing devices grasped by the user such as smartphones or game controllers. At this time, the information processing device grasped by the user may detect grasping pressure of the user through the pressure sensor 104.

Further, in an information processing device having a touch panel such as a smartphone, the pressing pressure of the vibrating device 102 against the user may be detected using the touch panel. For example, in a case in which the smartphone is inserted in a pocket, the smartphone may detect the pressing pressure of the vibrating device 102 against the user using the touch panel.

2. Example in which Vibration Data is Corrected in Accordance with Wearing Position <2-1. Example in which Strength of Vibration Data is Corrected in Accordance with Wearing Position>

The example in which the vibration data is corrected in accordance with the pressing pressure of the vibrating device 102 against the user has been described above. An example in which the vibration data is corrected in accordance with the wearing position of the vibrating device 102 will be described below.

Figure 12:
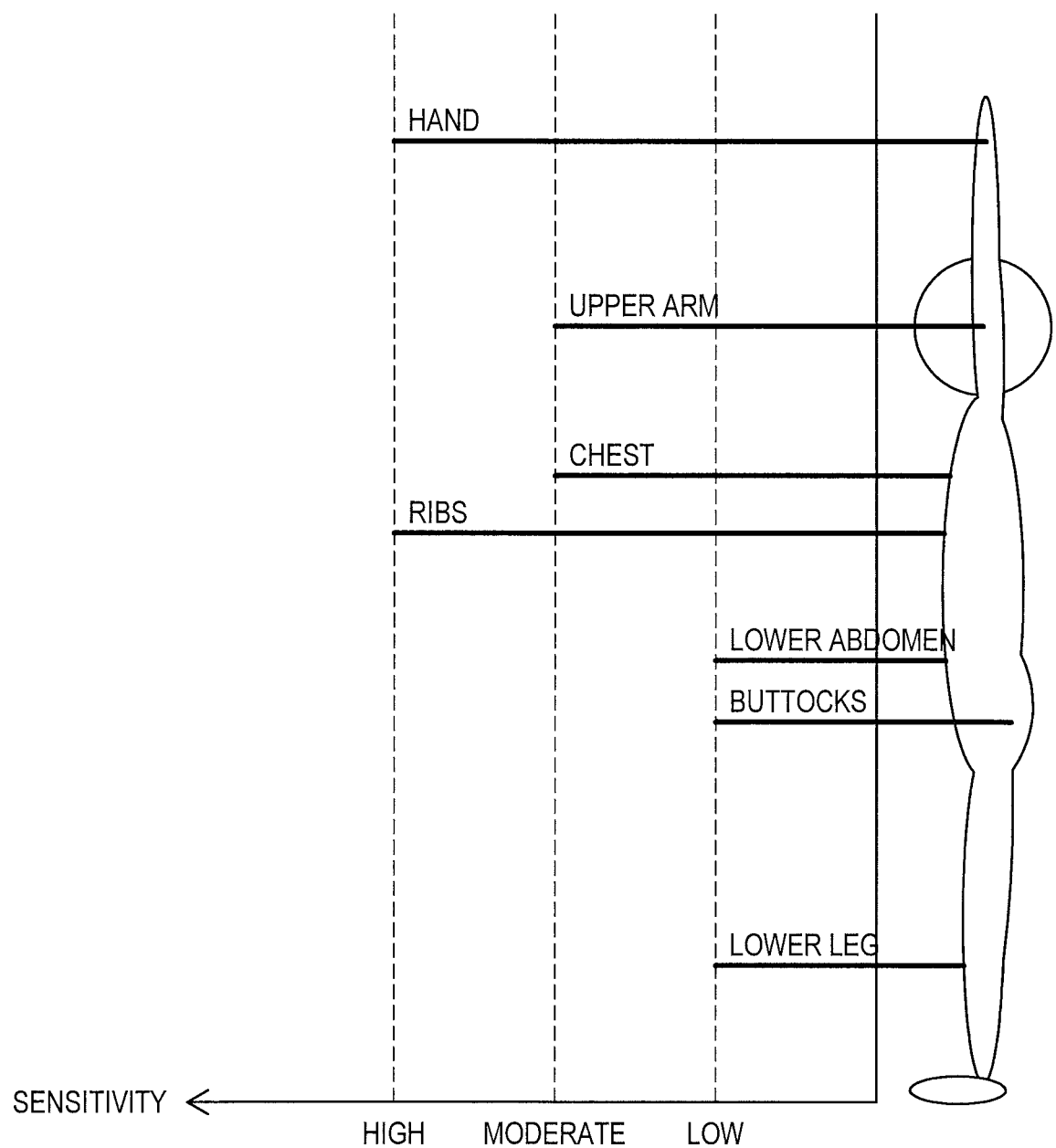
FIG. 12 is a diagram illustrating a vibration experience strength in each part of a person.

As described above, the sensitivity at which the user feels the vibration changes depending on the pressing pressure of the vibrating device 102 against the user. Further, the sensitivity at which the user feels the vibration differs depending on a part of the body. FIG. 12 is a diagram simply illustrating a relation between each part of the body and a sensitivity at which the vibration is felt.

As illustrated in FIG. 12, a human hand has a high sensitivity to the vibration, and the lower abdomen and the lower legs have a low sensitivity to the vibration. Further, a sensitivity of the upper arms and the chest is moderate, and a sensitivity of a part close to the ribs in the chest is high. As described above, the sensitivity at which a person feels the vibration varies from part to part. Therefore, in a case in which the vibration data is not corrected, for example, in a case in which a state in which the wristband type wearable terminal 100 is worn on the hand is compared with a state in which the wristband type wearable terminal 100 is worn on the ankle, the user feels weaker vibration for the same vibration strength in the letter state. Thus, for example, in a case in which the user wears the wearable terminal 100 on the ankle, the user may not notice a notification given through the vibration.

Due to the reasons described above, it is preferable that the strength of the vibration data be corrected on the basis of a position on which the wearable terminal 100 is worn so that the user can feel the same vibration.

Figure 13:
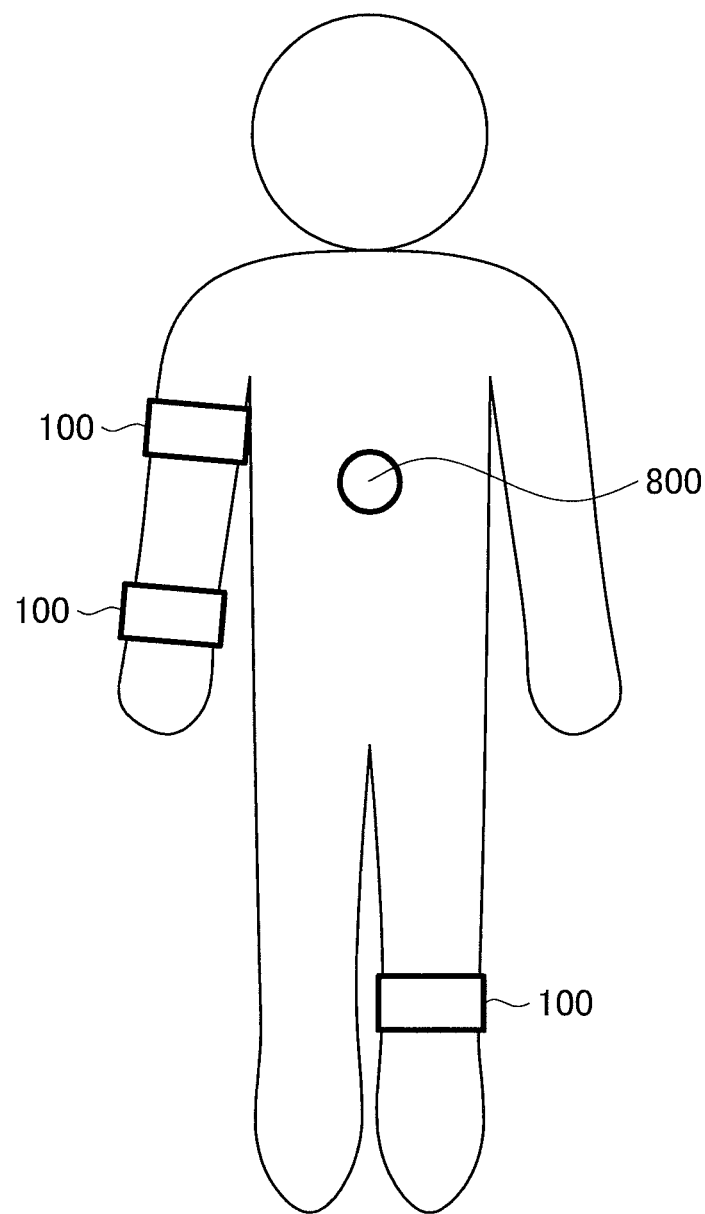
FIG. 13 is a diagram illustrating an example of a wearing position of a wearable terminal in an embodiment of the present disclosure.

FIG. 13 is a diagram illustrating positions on which the wristband type wearable terminal 100 illustrated in FIG. 3 is likely to be worn. The wristband type wearable terminal 100 may be worn on the wrist or may be worn on the upper arm or the ankle. Under such circumstances, since the human sensitivity to the vibration differs as described above, the wearable terminal 100 according to the present embodiment corrects the vibration data in accordance with a wearing position. Further, a reference device 800 illustrated in FIG. 13 is used to determine the wearing position of the wearable terminal 100 as will be described later.

Figure 14:
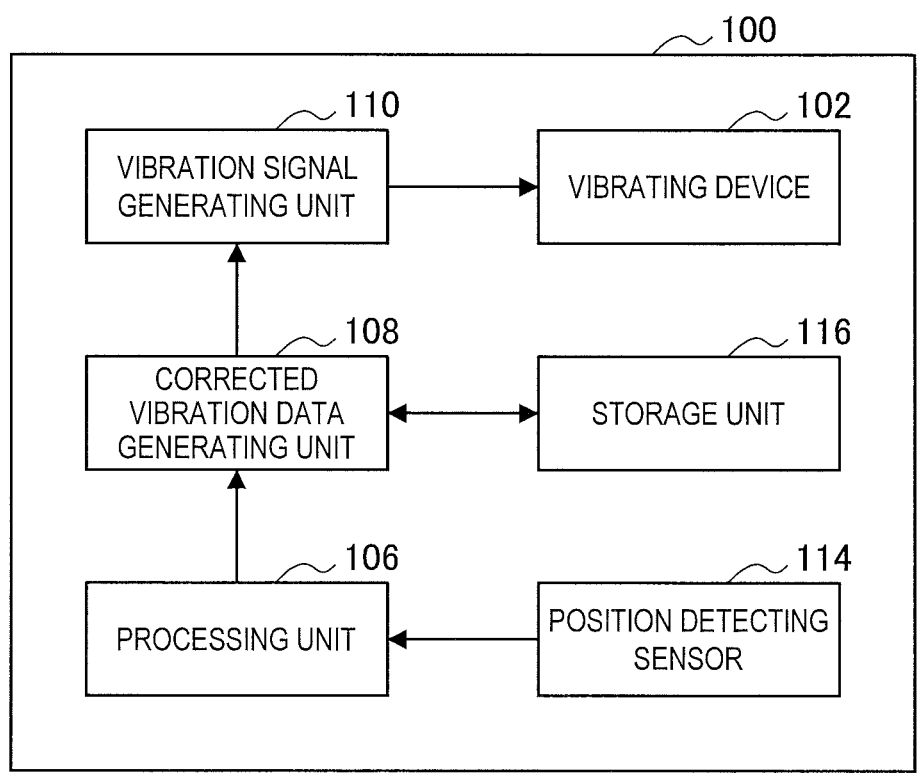
FIG. 14 is a block diagram illustrating an example of another configuration of the wearable terminal according to the embodiment of the present disclosure.

FIG. 14 is a block diagram illustrating a configuration of the wearable terminal 100 according to the present embodiment. As illustrated in FIG. 14, the wearable terminal 100 according to the present embodiment further includes a position detecting sensor 114 and a storage unit 116.

The position detecting sensor 114 detects the position of the wearable terminal 100. For example, the position detecting sensor 114 may be a motion sensor such as an acceleration sensor or a gyro sensor. Further, the position detecting sensor 114 may estimate the wearing position of the wearable terminal 100 from a trend of change in information detected by the motion sensor. Here, the information detected by the motion sensor may be an acceleration detected by the acceleration sensor or an angular speed or an angular acceleration detected by the gyro sensor.

Further, the position detecting sensor 114 may be a magnetic sensor, an ultrasonic sensor, or a sensor using a radio wave. For example, the position detecting sensor 114 may estimate the wearing position of the wearable terminal 100 on the basis of a distance or a direction from the reference device 800 as illustrated in FIG. 13. At this time, in order to detect the distance or the direction from the reference device 800, a magnetic wave, an ultrasonic wave, or a radio wave described above may be used.

The storage unit 116 stores a relation between the wearing position of the wearable terminal 100 and the correction information as illustrated in FIG. 15. For example, in a case in which the wearable terminal 100 is worn on the wrist having the high sensitivity, the correction information is stored so that the vibration strength is relatively weakened. Further, in a case in which the wearable terminal 100 is worn on the upper arm having the moderate sensitivity, the correction information is stored so that the vibration strength is relatively stronger than in a case in which the wearable terminal 100 is worn on the wrist. Further, the vibration data correction method is not limited to the example described above, and the corrected vibration data generating unit 108 may generate the corrected vibration data by multiplying the vibration data by a reciprocal of a value of the vibration experience sensitivity illustrated in FIG. 12 as a coefficient.

Figure 16:
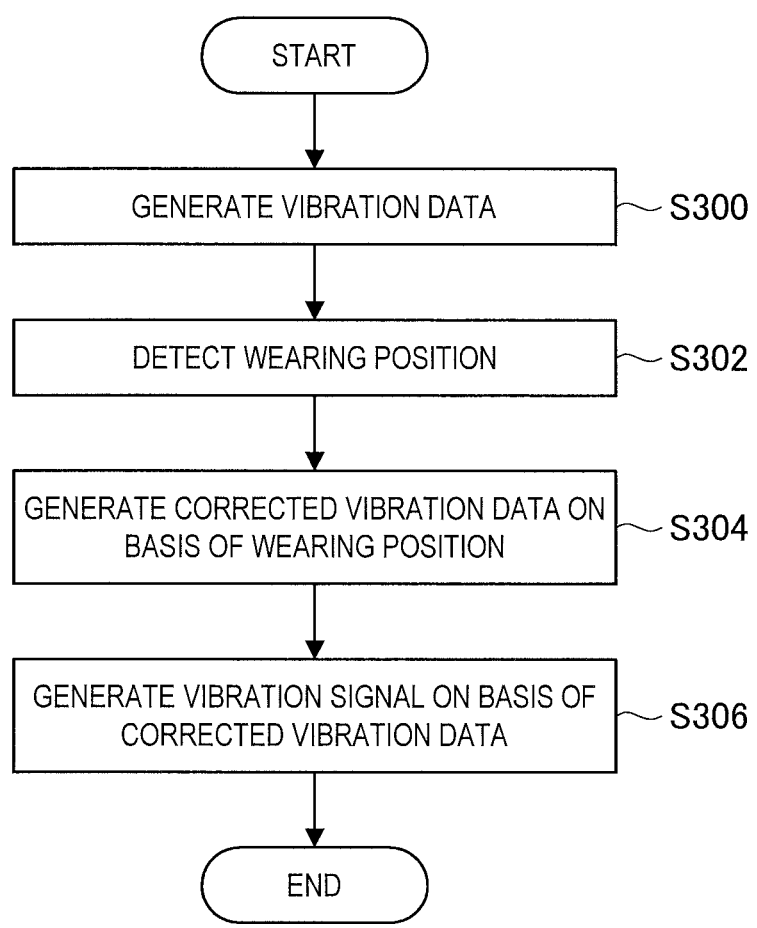
FIG. 16 is a flowchart illustrating another example of a process performed in a wearable terminal in an embodiment of the present disclosure.

The configuration of the wearable terminal 100 according to the present embodiment has been described above. A process performed in the wearable terminal 100 according to the present embodiment will be described below. FIG. 16 is a flowchart illustrating an example of a process performed in the wearable terminal 100 according to the present embodiment.

First, in S300, the processing unit 106 generates the vibration data for driving the vibrating device 102. Then, in S302, the position detecting sensor 114 detects the wearing position of the wearable terminal 100. Then, in S304, the corrected vibration data generating unit 108 generates the corrected vibration data on the basis of the vibration data received from the processing unit 106 and the wearing position of the wearable terminal 100 detected by the position detecting sensor 114. As described above, the corrected vibration data generating unit 108 reads the correction information from the storage unit 116 on the basis of the wearing position of the wearable terminal 100 detected by the position detecting sensor 114 and generates the corrected vibration data using the correction information.

Then, the vibration signal generating unit 110 receives the corrected vibration data from the corrected vibration data generating unit 108, performs a process such as D/A conversion, and generates the vibration signal. Further, the vibrating device 102 vibrates on the basis of the vibration signal generated by the vibration signal generating unit 110.

As described above, the vibration data is corrected on the basis of the wearing position of the wearable terminal 100 detected by the position detecting sensor 114. Further, since the vibrating device 102 vibrates in accordance with the corrected vibration data, the vibration causing the user to feel the same sensory strength regardless of the contact position of the wearable terminal 100 is generated.

Further, it is also preferable to correct the vibration data even in the jacket type wearable terminal 100 including a plurality of vibrating devices 102 as illustrated in FIG. 7. For example, in a case in which a plurality of vibrating devices 102 vibrate similarly (for example, in a case in which the type of vibration data is one), the user strongly feels the vibration generated from the vibrating device placed at a place in which the pressing pressure is strong, and the user does not feel a uniform vibration strength. Thus, in the present embodiment, the vibration data is corrected in accordance with the position of the vibrating device 102 installed in the jacket type wearable terminal 100. Further, in the jacket type wearable terminal 100, since the positions of a plurality of vibrating devices 102 are decided in advance, it is possible to correct the vibration data in accordance with the installation position of the vibrating device 102 in the wearable terminal 100 with no process of detecting the wearing position of the vibrating device 102.

For example, in the example illustrated in FIG. 7, the vibration data for the vibrating devices $102c$ and $102f$ positioned closer to the lower abdomen having the relatively low vibration sensitivity may be corrected to be stronger than the vibration data for the vibrating devices $102a$ and $102d$ positioned closer to the chest having the relatively high vibration sensitivity. According to the above-described configuration, the user can feel more uniform vibration in accordance with the wearing part of the vibrating device 102. Accordingly, the user can experience vibration giving a more realistic in a game, for example.

<2-2. Example in which Frequency of Vibration Data is Corrected in Accordance with Wearing Position>

The example in which the strength of the vibration data is corrected in accordance with the wearing position has been described above. An example in which the frequency of the vibration data is corrected in accordance with the wearing position will be described below.

As described above, the sensitivity that the user feels the vibration changes depending on the wearing position of the wearable terminal 100. Further, a human sensitivity to a frequency differs depending on a part of the body, and a sensitivity to vibration in X, Y, and Z axis directions also differs depending on a frequency change or a part of the body.

Thus, in a case in which an information processing device such as a smartphone including a vibrating device 102 is detected to be held in the hand, it is preferable to correct the vibration data so that the vibrating device 102 vibrates at a frequency at which a sensitivity felt on the palm is high. Further, in a case in which the smartphone is detected to be inserted in a pocket or the like near the buttocks, it is preferable to correct the vibration data so that the vibrating device 102 vibrates at a frequency at which a sensitivity felt at the buttocks is high. Specifically, for example, in a case in which it is detected that the smartphone is accommodated in a pocket or the like in the vicinity of the buttocks, it is desirable to causing the smartphone to vibrate h relatively lowering the frequency of vibration compared with a normal state such as a state in which the smartphone is held by hand. Alternatively, in a case in which the smartphone is detected to be inserted a bag or in a case in which the smartphone is detected to be placed on a surface, it is preferable to change the frequency of vibration and perform the vibration in accordance with each situation.

Further, the fact that the smartphone is held by the hand or inserted in the pocket near the buttocks may be detected through the similar configuration as the position detecting sensor 114. In other words, the position detecting sensor 114 may estimate the position of the smartphone from a trend of change in information detected by the motion sensor. Further, the position detecting sensor 114 may be a magnetic sensor, an ultrasonic sensor, or a sensor using a radio wave and estimate the position of the smartphone on the basis of a distance or a direction from the reference device 800.

Further, that fact that the smartphone is held by the hand or inserted in the pocket may be estimated through a proximity sensor installed in the smartphone. Specifically, in a case in which an object is determined to be placed near a screen of the smartphone through the proximity sensor, the smartphone may be estimated to be in the pocket or the bag. Further, in a case in which no object is determined to be placed near the screen of the smartphone, the smartphone may be estimated to be in the hand. The estimation described above may be performed by a combination of values of the proximity sensor and the motion sensor.

Further, as illustrated in FIG. 12, since the hand and the buttocks greatly differ in the sensitivity to the strength of vibration, it is preferable to correct the vibration data for the strength of vibration in addition to the vibration data for the vibration frequency.

As described above, the vibration data is corrected so that the frequency at which the vibrating device 102 vibrates changes on the basis of the position detected by the position detecting sensor 114. Accordingly, the user can experience vibration suitable for a sensitivity characteristic of each part to the strength of vibration or the frequency.

Figure 17:
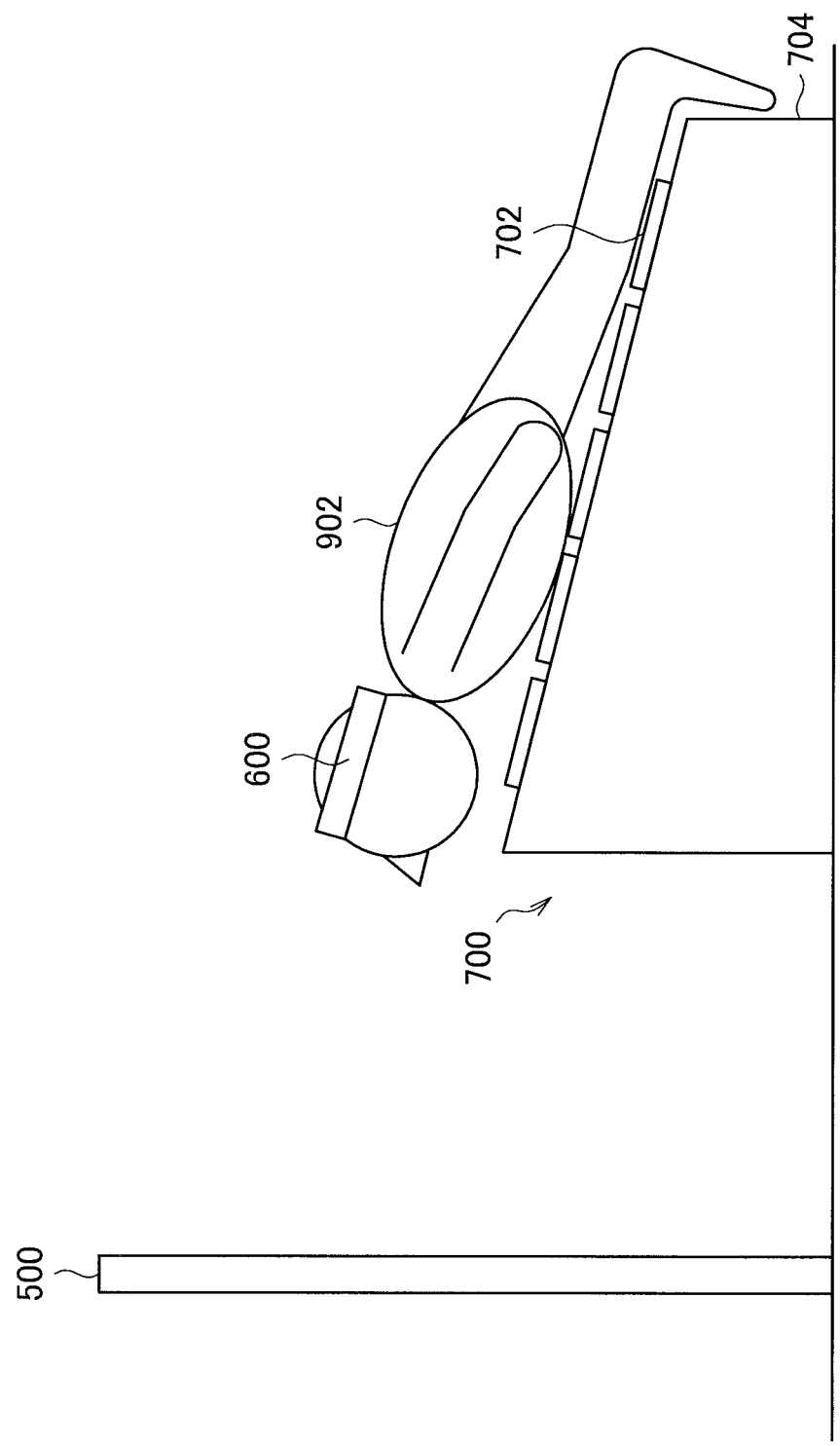
FIG. 17 is a diagram illustrating an example of a vibration stand equipped with a vibrating device in an embodiment of the present disclosure.

Further, the process of correcting the vibration data may be applied to a stationary type system that presents vibration to the user. FIG. 17 is a diagram illustrating an example of a system including a display device 500 that displays a video, a head mounted type wearable terminal 600 that presents vibration to a user 902, and a vibration stand 700.

In the system illustrated in FIG. 17, a video for presenting a feeling of flying in the sky to the user 902 may be displayed on the display device 500. Further, in the system according to the present embodiment, the user 902 can feel vibration on the front of the body since the user 902 lies on the vibration stand 700, and the vibration is presented to the user 902 by the head mounted type wearable device 600. Further, the display device 500 may be a head mounted display instead of a screen as illustrated in FIG. 17.

In the system illustrated in FIG. 17, vibration of cutting through air is presented to the user using the head mounted type wearable device 600 and the vibration stand 700, and thus the user 902 can experience a feeling that the user 902 is flying in the sky. Further, the head mounted type wearable terminal 600 and the vibration stand 700 are an example of an information processing device that corrects the vibration data as described above.

The head mounted type wearable device 600 may present the vibration to the user 902, and the vibration may be presented behind the head of the user 902 or behind the neck. Accordingly, an illusion of a center-of-gravity sensation is given to the user 902, and an acceleration deceleration feeling which the user 902 feels is enhanced. Further, since vibration of expressing a feeling of collision in front of the head of the user 902 is presented, the feeling of flying in the sky is further enhanced. At this time, the head mounted type wearable device 600 may further include a pressure sensor 104 and correct the vibration data as described above on the basis of the pressure detected by the pressure sensor 104.

The vibration stand 700 according to the present embodiment includes a vibrating plate 702 and a pedestal 704. A plurality of vibrating plates 702 may be installed in the vibration stand 700, and the vibrating plate 702 presents the vibration to the user 902 as the vibrating device 102 vibrates. As illustrated in FIG. 17, since the user 902 lies on the vibration stand 700, the vibration is presented in a state in which the weight of the user 902 is not applied to the leg of the user 902, and thus the feeling of floating which the user 902 feels is enhanced.

Figure 18:
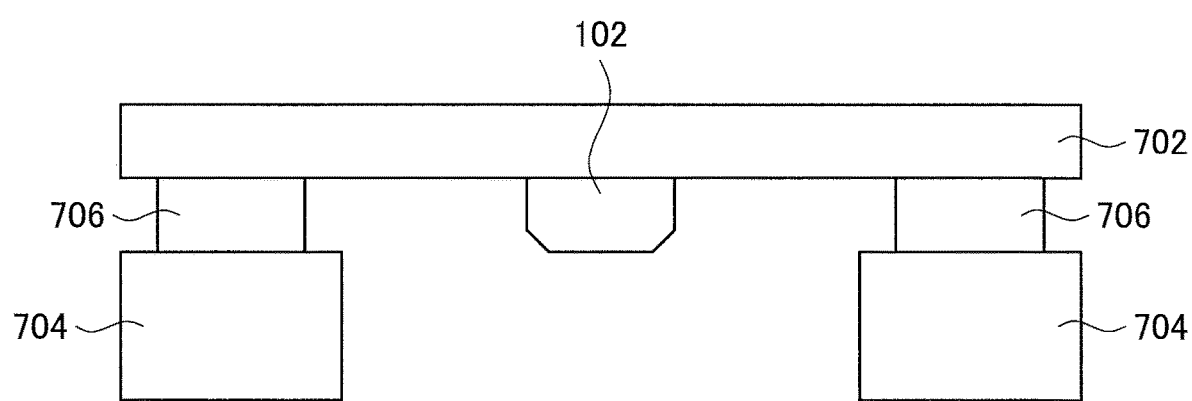
FIG. 18 is a diagram illustrating an example of a structure of a vibrating plate placed in the vibration stand illustrated in FIG. 17.

FIG. 18 is a diagram illustrating an example of a configuration between the vibrating plate 702 and the pedestal 704. Each vibrating plate 702 includes the vibrating device 102, and when the vibrating device 102 vibrates, the vibrating plate 702 also vibrates. Further, each vibrating plate 702 is supported by an elastic member 706 to be able to vibrate the pedestal 704.

Further, similarly to the jacket type wearable terminal 100, in the vibration stand 700, a correspondence relation between a part of the body of the user 902 and the position of the vibrating plate 702 is basically specified. Hence, it is preferable to correct the vibration data so that the vibration strength and the frequency of each vibrating plate 702 change in accordance with the difference in the sensitivity of each part of a person who feels the vibration.

Further, in the vibration stand 700 according to the present embodiment, the position relation between a part of the body of the user 902 and the vibrating plate 702 may change in accordance with the height of the user 902. Therefore, the position relation between a part of the body of the user 902 and the vibrating plate 702 may be automatically corrected using height information or the like of the user 902.

Further, each vibrating plate 702 of the vibration stand 700 further includes a pressure sensor 104 that detects a contact pressure with the body of the user 902, and the vibration data correction described above may be performed on the basis of the pressure detected by the pressure sensor 104. Alternatively, instead of the pressure sensor 104, a range sensor or the like for detecting a deformation amount of the elastic member 706 may be provided, and the vibration data correction may be performed on the basis of a distance detected by the range sensor. At this time, since the pressing pressure on the vibrating device 102 is estimated to increase as the distance decreases, for example, the correction may be performed to weaken the vibration data.

3. Structure of Vibrating Device

Figure 19:
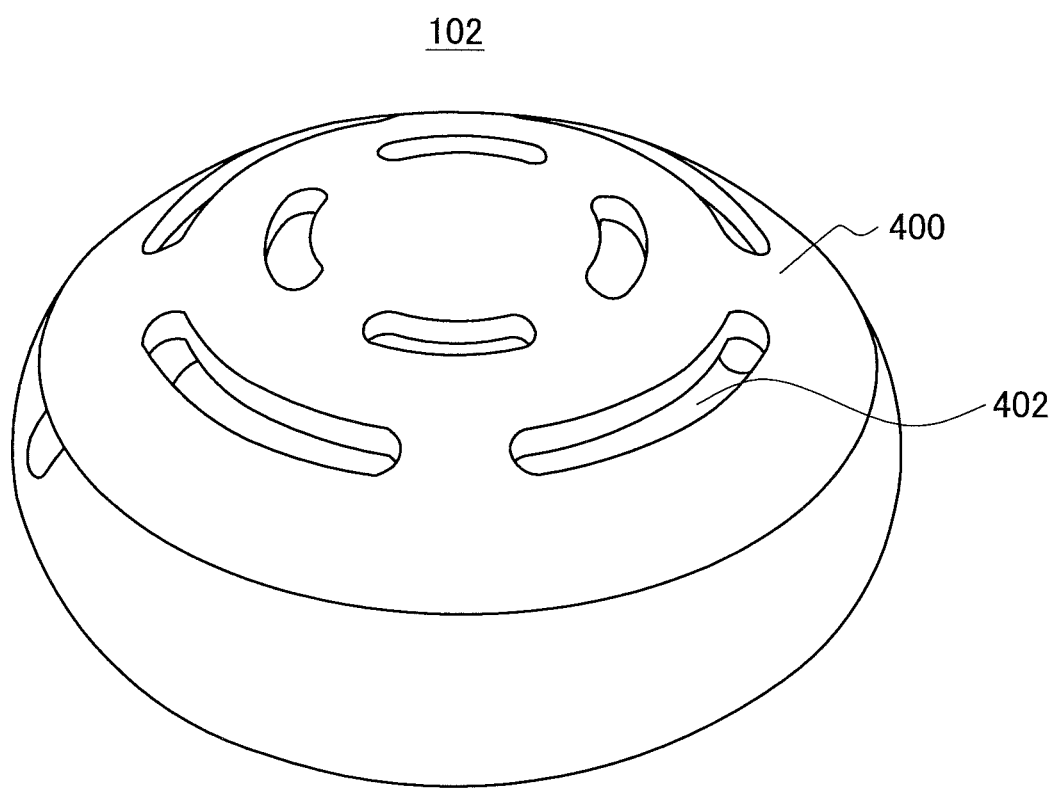
FIG. 19 is a diagram illustrating an example of a vibrating device in an embodiment of the present disclosure.
Figure 20:
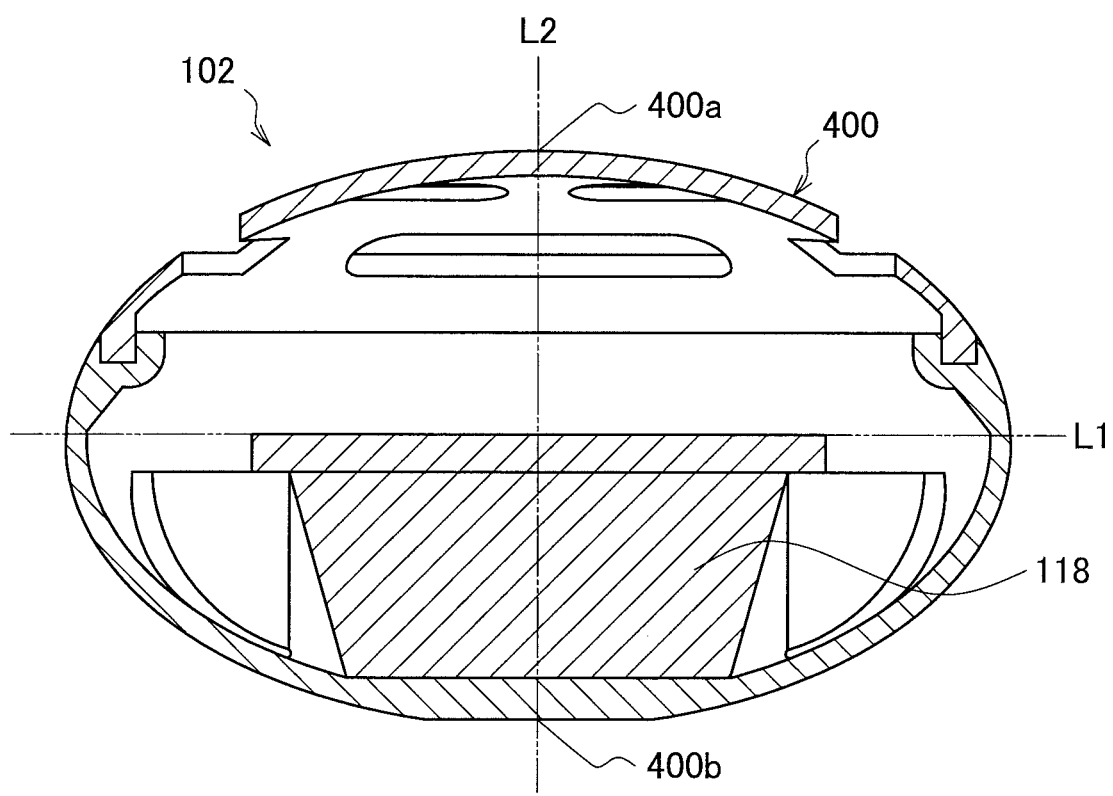
FIG. 20 is a cross-sectional view illustrating a cross section of a vibrating device in an embodiment of the present disclosure.

The example in which the vibration data is corrected in accordance with the wearing position has been described above. A specific configuration of the vibrating device 102 according to the present disclosure will be described below FIG. 19 is a diagram illustrating an external appearance of the vibrating device 102, and FIG. 20 is a diagram illustrating a cross section of the vibrating device 102. As illustrated in FIGS. 19 and 20, the vibrating device 102 includes a case 400 having an elliptical-shaped cross section. As described above, since the cross section of the case 400 has an elliptical shape, even if an angle at which the vibrating device 102 comes into contact with the body of the user 902 changes, the vibrating device 102 comes into contact with the body of the user 902 at the similar pressure.

In further detail, referring to FIG. 20, the cross section of the case 400 has a major axis L1 and a minor axis L2. Further, a vibrator 118 is placed on one of surfaces 400a and 400b in which the minor axis L2 and a tangent line are perpendicular. In a case in which the vibrator 118 is placed as described above, the surface 400*a* on which the vibrator 118 is not placed vibrates more strongly than the surface 400*b* on which the vibrator 118 is placed owing to the vibration of the vibrator 118. Further, as illustrated in FIG. 20, since a magnitude of a generated sound decreases as the area of the surface 400*a* which vibrates more strongly decreases, an opening portion 402 for controlling the generation of the sound is placed in the surface 400*a* of the case 400 which vibrates more strongly.

Figure 21:
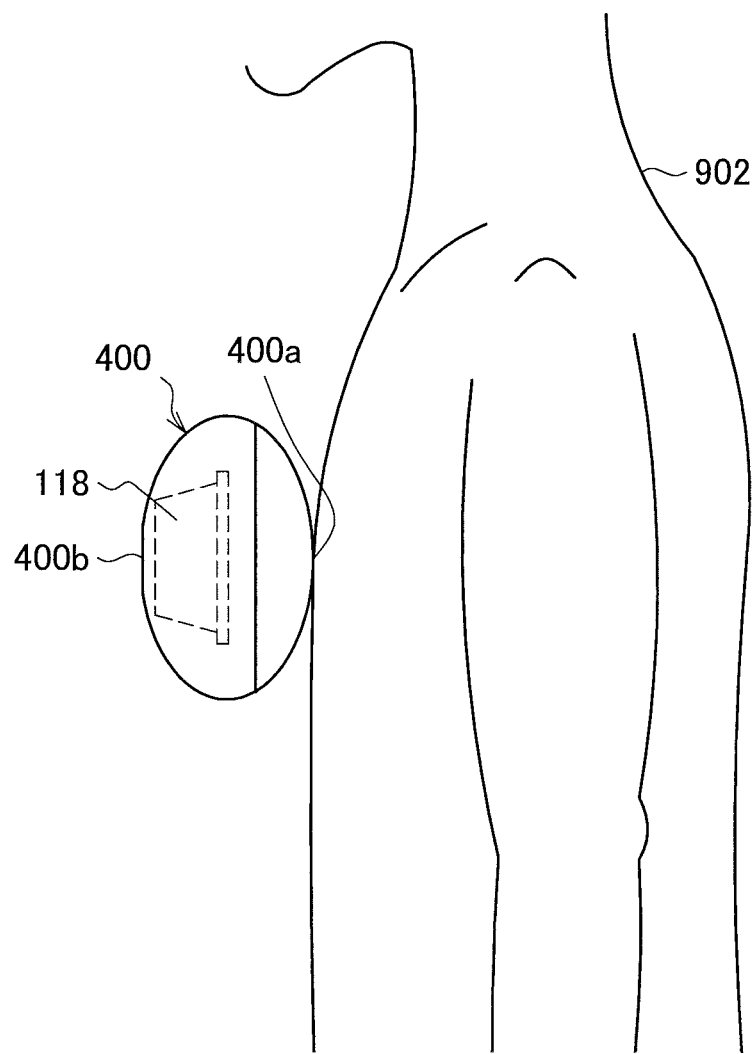
FIG. 21 is a diagram illustrating a method of wearing a vibrating device in an embodiment of the present disclosure.

FIG. 21 is a diagram illustrating a state in which the vibrating device 102 is worn on the user 902. As illustrated in FIG. 21, the vibrating device 102 is placed so that the surface 400*a* on which the vibrator 118 is not placed is a contact surface with the user 902. With such a configuration, since the surface 400*a* on which the vibrator 118 of the case 400 is not placed strongly vibrates by the vibration of the vibrator 118, the vibration is efficiently transferred to the user 902.

Figure 22:
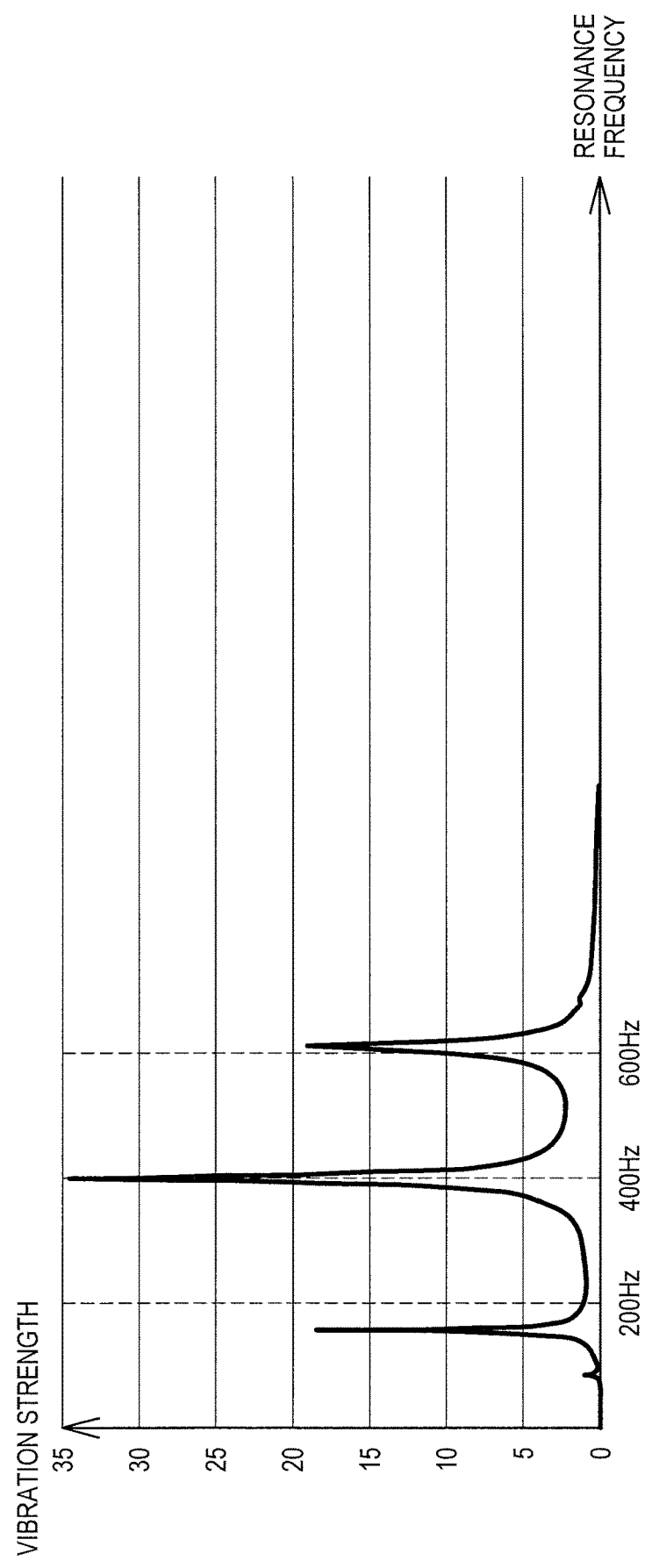
FIG. 22 is a diagram illustrating a relation between a vibration strength and a resonance frequency of a vibrating device in an embodiment of the present disclosure.

FIG. 22 is a diagram illustrating an example of a resonance frequency (frequency characteristic) of the vibrating device 102. FIG. 22 illustrates that the vibration strength increases at around 200 Hz, 400 Hz, and 600 Hz. As described above, the resonance frequency of the case 400 is adjusted in accordance with the vibration frequency sensitivity characteristic of each part, and thus the vibration is transferred to the user 902 with high energy efficiency. For example, since the frequency at which the sensitivity is high in the palm is 200 Hz as described above, it is preferable that the vibrating device 102 installed in the wearable terminal 100 worn on the palm have the resonance frequency of 200 Hz.

Further, the resonance frequency may be set in accordance with a peak frequency (for example, 200 Hz) of the human sensitivity so that the vibration strength may be sensibly maximized. Further, conversely, the resonance frequency of the case 400 may be set in accordance with the sensitivity of the part with low human sensitivity to the vibration (for example, the buttocks so that the frequency characteristic of the vibration felt by the user 902 can be made close to flat.

Further, instead of employing the structure of the case 400, the vibration strength may be maximized or flattened by performing an electrical/software frequency correction process on an input signal. Since the frequency sensitivity characteristics differ depending on the part of the person as described above, it is preferable that the frequency correction of the characteristic of the case 400 and the input vibration be changed in accordance with the position in which the vibrating device 102 is placed. Further, the pressure sensor 104 that detects the pressing pressure of the vibrating device 102 against the user 902 may be placed on the surface of the case 400 of the vibrating device 102.

4. Feedback Caused by Non-Contact Event on Virtual Manipulation Object

Meanwhile, in recent years, an event in a virtual space for a game is fed back to the user by vibration. In a case in which a game machine main body is grasped by the user, the game machine main body can vibrate and in a case in which a controller separated from the game machine main body is grasped by the user, the controller can vibrate.

For example, in a case in which a virtual manipulation object serving as a target to be manipulated by the user is placed in the virtual space, and the virtual manipulation object collides with another virtual object in the virtual space, the game machine causes a vibrating device placed in the game machine or the controller to vibrate. Further, the game machine can control the feedback of the vibration even in a case in which the virtual object does not collide with the virtual manipulation object. A specific example will be described below in detail with reference to FIG. 23.

Figure 23:
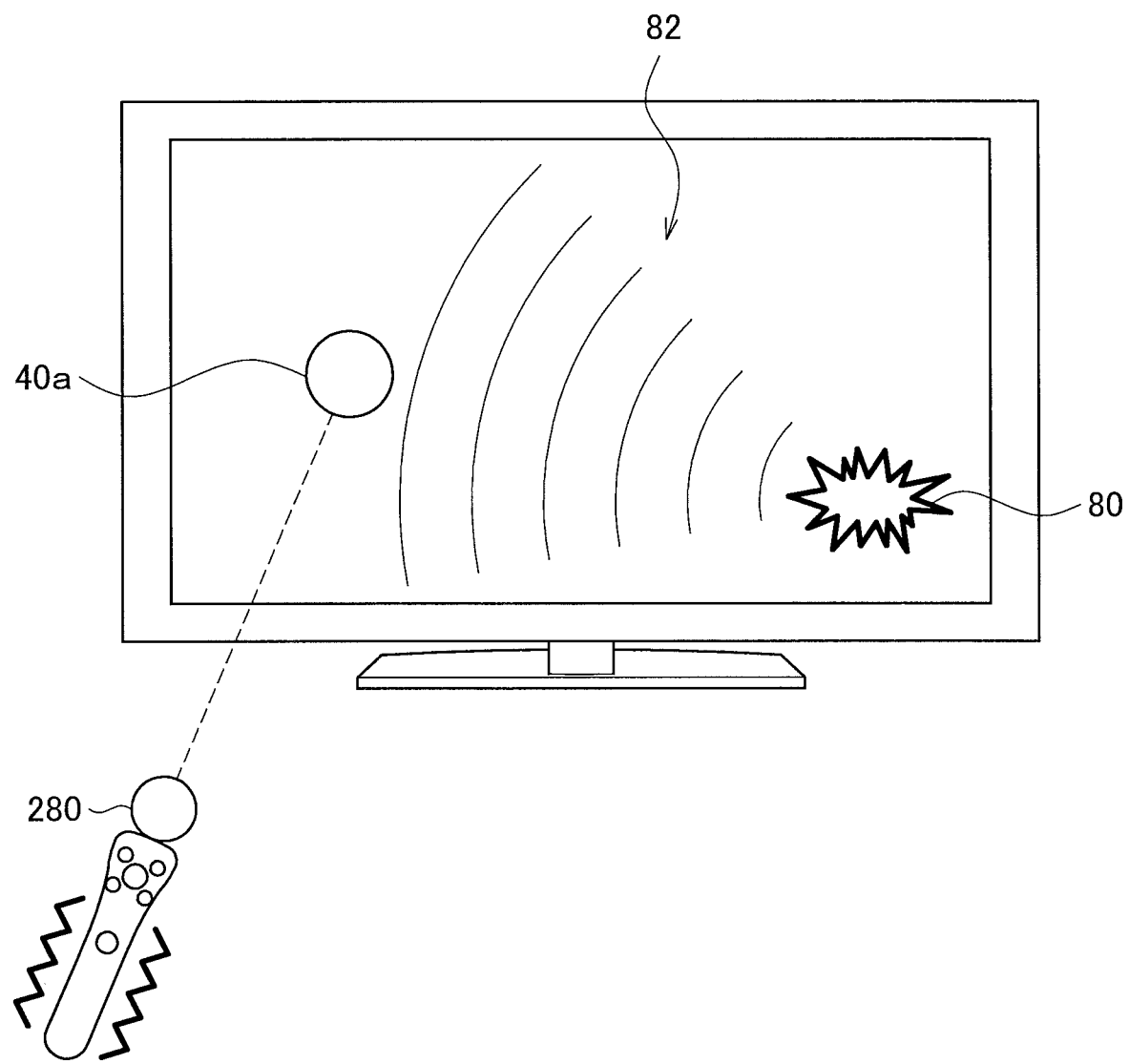
FIG. 23 is a diagram illustrating another example of an event in which feedback of vibration occurs in an embodiment of the present disclosure.

FIG. 23 is a diagram illustrating an example in which the feedback of the vibration is given on the basis of a shock wave 82 generated by a shock wave generation source 80 placed at a position apart from the virtual manipulation object 40*a*. Further, the shock wave generation source 80 may be, for example, an explosion, and propagation of the shock wave 82 may be simulated by the physical engine within the virtual space.

In an example of FIG. 23, a virtual manipulation object 40*a* is placed at a position indicated by a controller 280, and a shock wave 82 caused by an explosion occurred within the virtual space reaches the virtual manipulation object 40*a*, and thus the feedback of the vibration is given. At this time, the feedback of the vibration may be performed in accordance with a nature of a medium between the virtual manipulation object 40*a* and the shock wave generation source 80.

For example, the feedback of the vibration in a case in which the medium is air and the feedback of the vibration in a case in which the medium is water may differ in a strength of the vibration. At this time, in a case in which the medium is water, the vibration may be weaker than the vibration in a case in which the medium is air. This is because a propagation characteristic of the simulated shock wave 82 differs depending on a medium.

Accordingly, the user can feel that the virtual manipulation object 40*a* manipulated by the user is, for example, in the water by the feedback of the vibration, and thus the virtual sense of presence that the user can obtain is further improved.

Further, the vibration data may be generated simply in accordance with a distance between the shock wave generation source 80 and the virtual manipulation object 40*a* instead of the propagation of the shock wave 82 simulated within the virtual space. Accordingly, the feedback of the vibration is given by the physical engine having a simpler configuration as well.

5. Feedback of Vibration Based on Shape and Material of Virtual Object

The example in which the feedback of the vibration is given on the basis of the shock wave 82 has been described above. The feedback of the vibration based on a shape and a material of the virtual object 40 will be described below in further detail.

FIGS. 24 to 27 are diagrams illustrating an example in which the virtual manipulation object 40*a* passes over a semicircular virtual object 40*d*. The feedback of the vibration in such a situation will be described below. Further, the semicircular virtual object 40*d* has a surface having small friction (having a slippery feel).

Figure 24:
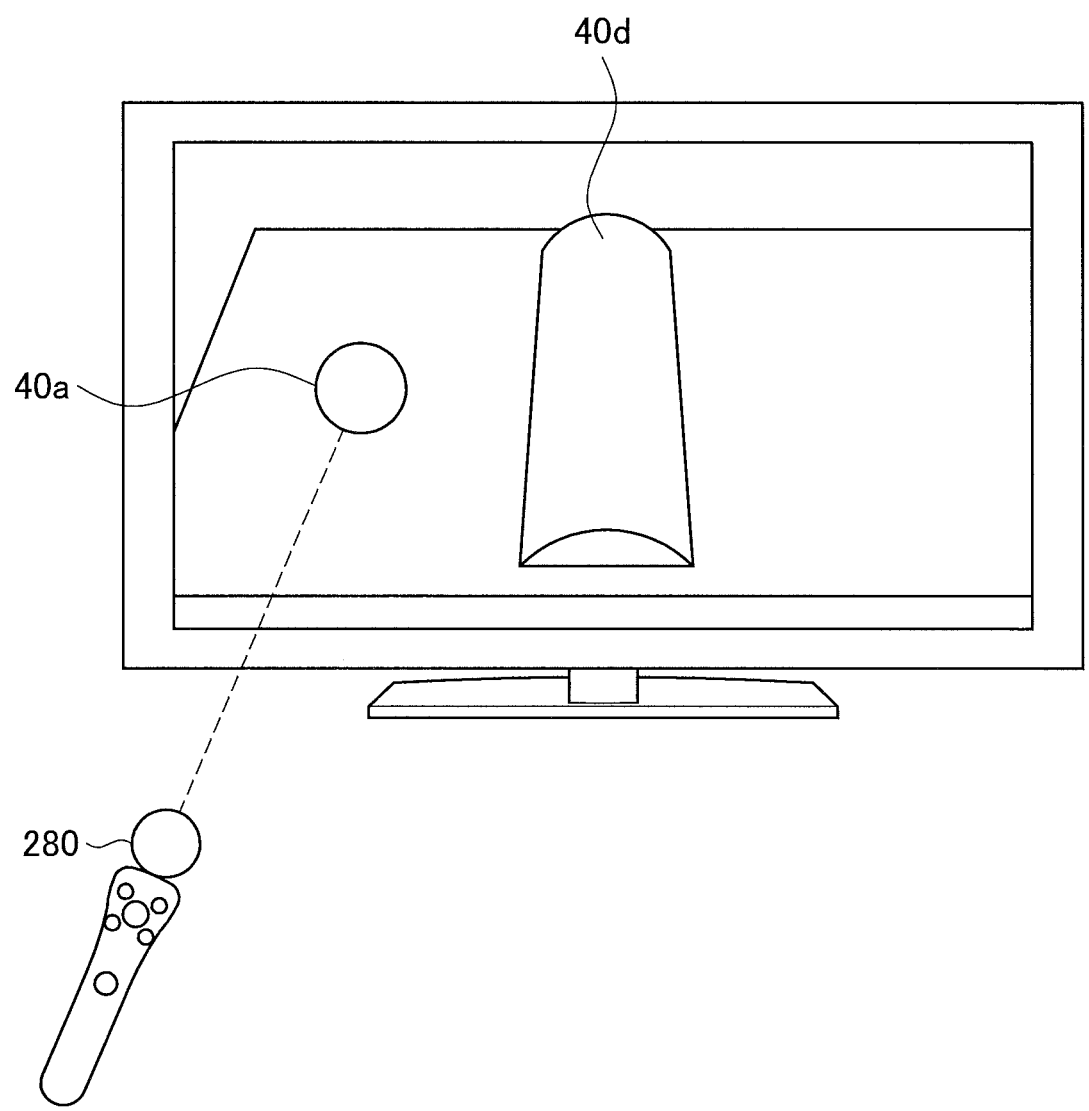
FIG. 24 is a diagram illustrating a method in which a shape and texture of a virtual object is expressed by vibration.
Figure 25:
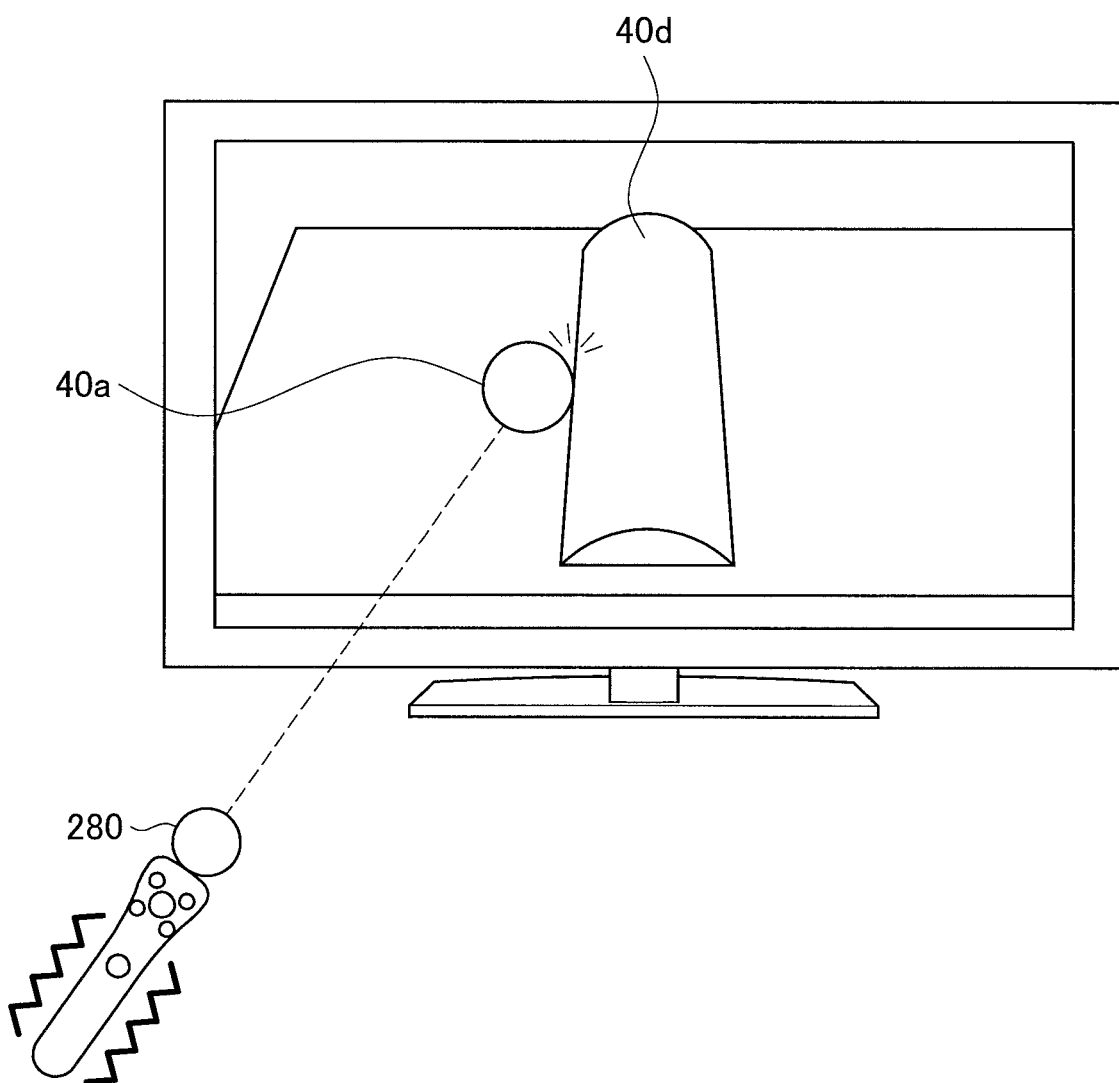
FIG. 25 is a diagram illustrating a method in which a shape and texture of a virtual object is expressed by vibration.
Figure 26:
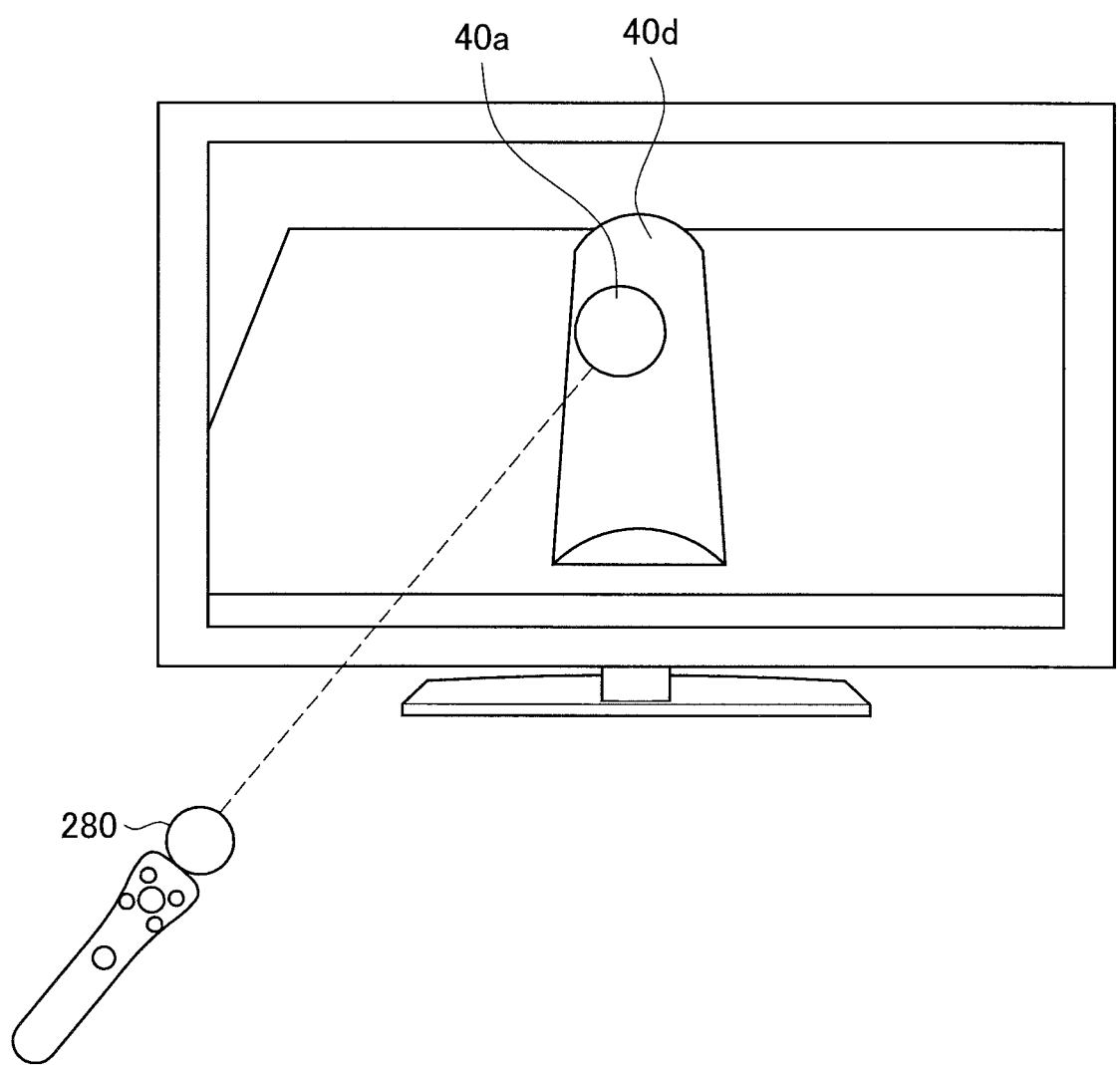
FIG. 26 is a diagram illustrating a method in which a shape and texture of a virtual object is expressed by vibration.
Figure 27:
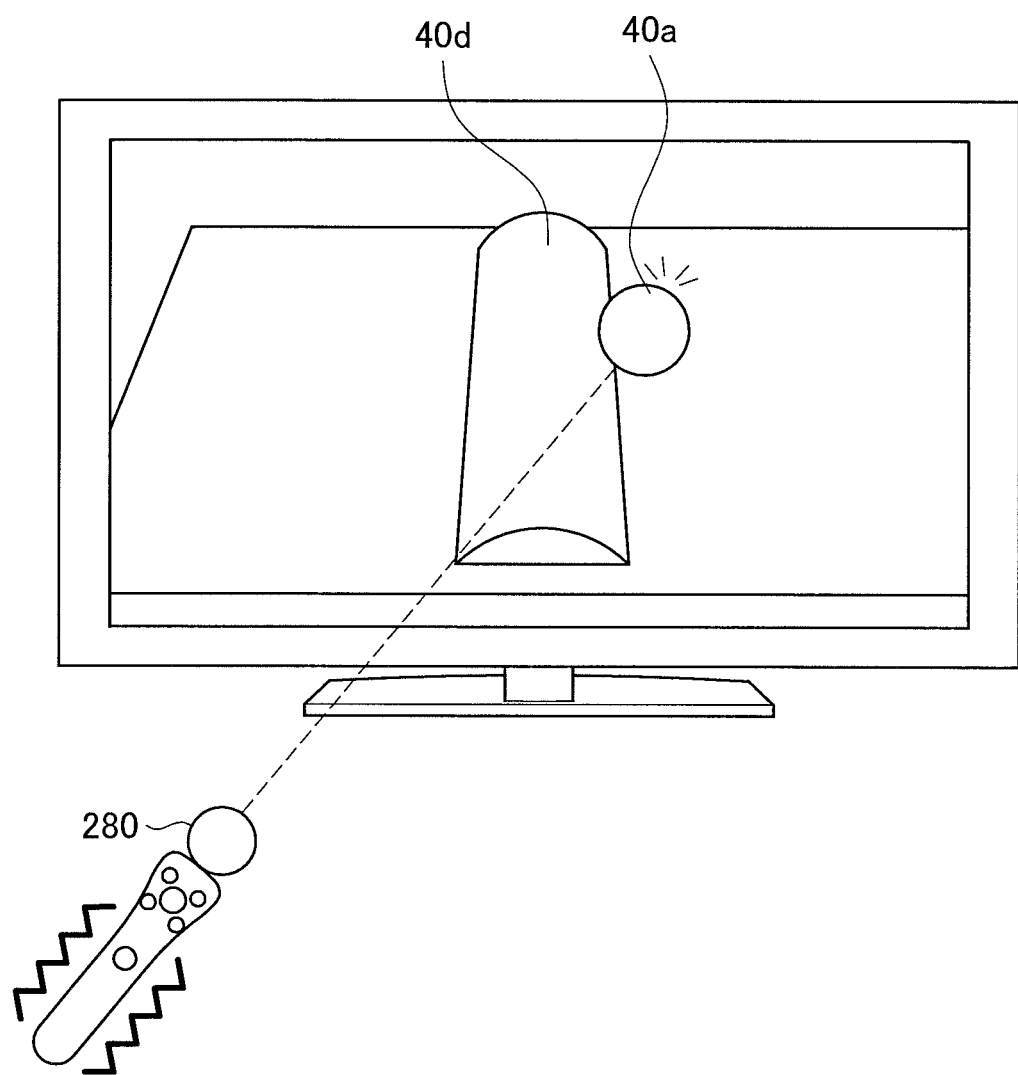
FIG. 27 is a diagram illustrating a method in which a shape and texture of a virtual object is expressed by vibration.

As illustrated in FIGS. 24 to 25, when the virtual manipulation object 40*a* moves and comes into contact with an end portion of the semicircular virtual object 40*d*, feedback of vibration with a short vibration time is given. Then, as illustrated in FIG. 26, the feedback of the vibration is not given while the virtual manipulation object 40*a* is moving on the surface of the semicircular virtual object 40*d*. Then, as illustrated in FIG. 27, when the virtual manipulation object 40*a* gets down to the other end of the semicircular virtual object 40*d*, feedback of vibration with a short vibration time is given again.

As described above, the vibration having the short vibration time is presented to the user at a timing at which the shape of the surface with which the virtual manipulation object 40*a* comes into contact changes (in the states illustrated in FIGS. 25 and 27), and thus the user can feel the change in the shape of the surface. Further, while the virtual manipulation object 40*a* is moving on the surface with small friction (in the state in FIG. 26), since the vibration is not presented, the user can feel the slippery feel. Further, at this time, since the virtual manipulation object 40*a* moves along the surface of the semicircular virtual object 40*d*, the user can feel a swollen shape of the semicircular virtual object 40*d* even through a sense of vision.

Figure 28:
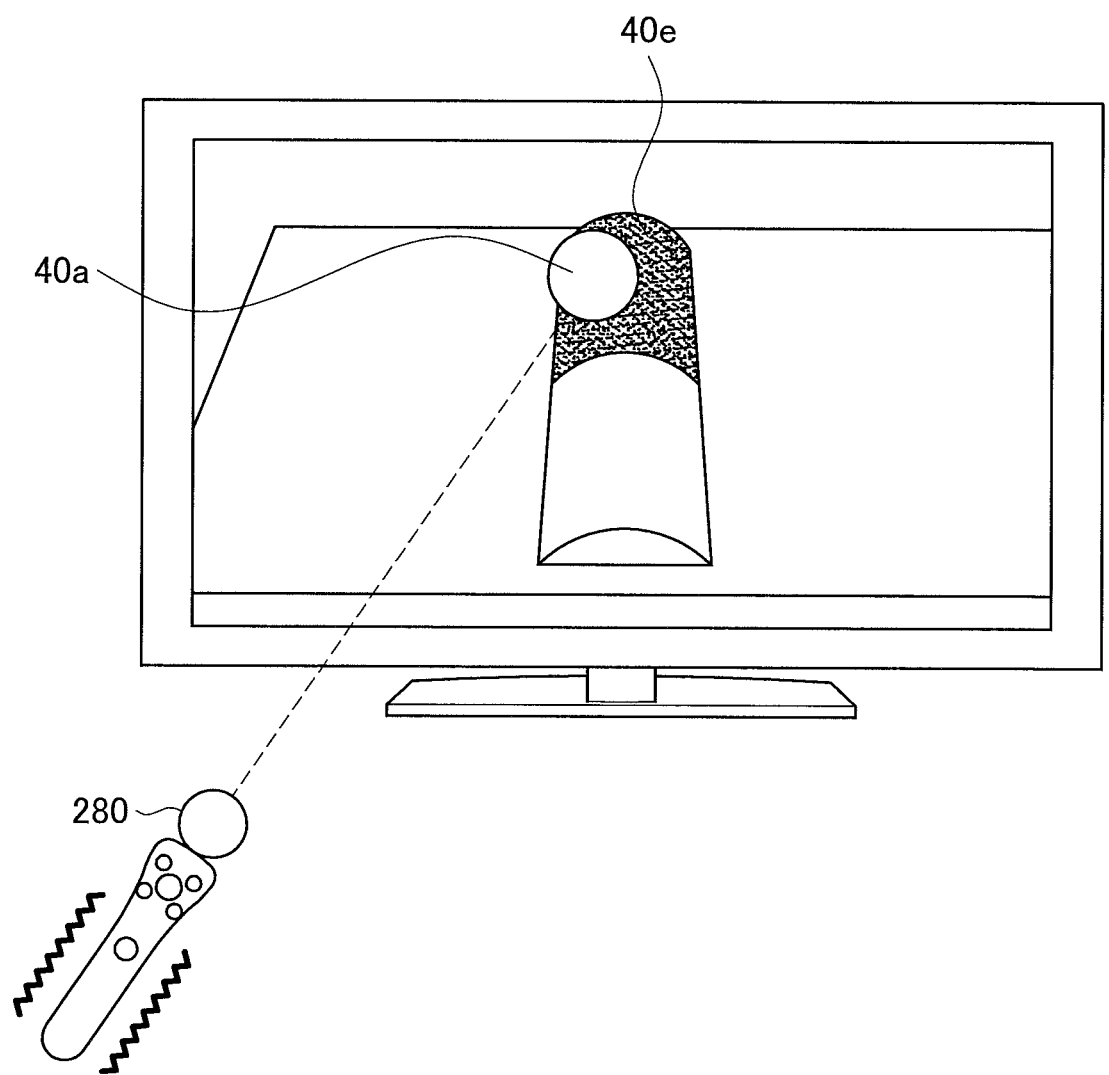
FIG. 28 is a diagram illustrating a method in which a shape and texture of a virtual object is expressed by vibration.

Further, in a case in which the virtual manipulation object 40*a* moves on a surface having large friction (having a rough feel), different vibration feedbacks may be given. FIG. 28 is a diagram illustrating an example in which a part 40*e* of the semicircular virtual object has a surface having large friction. At this time, when the virtual manipulation object 40*a* moves on the surface 40*e* having the large friction of the semicircular virtual object, vibration giving the user with a friction feeling is continuously provided to the user, and thus the user has a rough feel. Further, the vibration may change in accordance with a speed at which the user manipulates the virtual manipulation object 40*a*. For example, in the example of FIG. 28, as the speed at which the user manipulates the virtual manipulation object 40*a* increases, a time interval in which the controller 280 vibrates may decrease.

Further, in a case in which the virtual manipulation object 40*a* moves from a surface with small friction to a surface with large friction, the vibration to be given to the user changes, and thus the user can feel a change in the texture from the change in the vibration.

6. Application Example of Feedback

A specific example of the vibration feedback in a portable terminal which is disclosed in, for example, JP 2015-231098A and is grasped by the user and includes a vibrating device (an actuator) placed in each grip part grasped by the left and right hands of the user will be described below.

The terminal executes, for example, an application in which upper, lower, left, and right edges of a screen are set as side surfaces of a virtual box, and a ball virtually set in the box rolls upwards, downward, leftwards, and rightwards in the screen in accordance with an inclination of the game machine detected by the acceleration sensor (in a structure in which the box including the ball therein is looked into from an opening portion side, a behavior of the ball rolling in the box is simulated, and a behavior of ball including bounce when it hits the side surface is simulated by a physical simulator in the application.).

In the application, when the ball rolls or collides with the wall, audio or haptic feedback whose magnitude changes in accordance with a relative speed of the box and the ball is generated (it is an output from one actuator, and the user perceives a low band and intermediate and high bands as haptic information and a sound, respectively. As an audio or haptic feedback pattern, a decided waveform pattern is set in advance in accordance with a type of ball. In other words, the user obtains feedback of each piece of information of a sense of vision, a sense of hearing, and a sense of touch from the terminal. Further, since the inclination of the terminal is reflected in the behavior, the user can recognize his/her own somesthetic sense (information related to how his/her body moves) together as information.

When the ball hits the right and left walls, the user can intuitively recognize the wall which the ball hits on the basis of only the haptic information without visual or auditory information. Further, the user obtains a feeling that shock vibration occurs in a part which the ball collides and is transferred to the hand. This is because the actuators are placed on the left and right, the output of the left actuator increases when the ball hits the left, and the output of the right actuator increases when the ball hits the right. Accordingly, similarly to a stereo effect of a sound, the user perceives either the left or right wall as the wall which the ball hits on the basis of the magnitude of the haptic information.

On the other hand, when the ball hits the upper or lower wall, audio and haptic signals output from the actuator are the same for both the upper and lower walls (if a collision speed is the same). However, the user intuitively perceives the upper or lower wall as the wall which the ball hits. Further, the user has a feeling that the shock vibration occurs in an upper or lower collision part and is transferred to the hand.

It is because although the audio and haptic information is the same before and after, a cross modal effect works due to an action of a sense of vision and a somesthetic sense, and a "feeling of upward or downward collision" is obtained as an illusion accordingly. Further, even if the user makes a trial while closing his/her eyes and blocking his/her sense of vision, the "feeling of upward or downward collision" is still obtained as an illusion.

This is because the brain of the user thinks "I tilt the terminal so that the front side goes down, and as a result, a sense of touch and a sound are coming back by collision, and thus the information must come from the front (upper) wall" from experience knowledge. This is a simple example of cross modal perception.

As described above, the virtual ball is set in this application, but a material and a size of the ball can be changed virtually. A difference in the texture of the ball is indicated by audio and haptic signal patterns which are generated while the ball rolls or collides in addition to a difference in an image. These signal patterns are obtained by sampling of a collision sound and collision vibration of an actual ball, data synthesis, or processing of existing sound effect sounds or the like. Further, in order to make it more naturally, an appearance of the box side may differs depending on the material of the ball.

Further, in the case of metal, as compared with plastic, a metal property is expressed such that the audio and haptic information have a reverberation for a relatively long time after a collision. Further, in the case of rubber, a rubber property is expressed such that the occurrence of the sound is suppressed to be smaller than the haptic information.

By enhancing the reality of information of the sense of vision/sound/sense of touch, cross-modal perception is caused by an interaction of such senses, and the user has a feeling of a "weight" which is not actually changed in a pseudo manner. Specifically, a metal ball gives a relatively "heavy" feeling as compared with plastic. Further, a large ball gives a relatively "heavy" feeling as compared with a small ball. This is also an illusion that arises on the basis of the experience knowledge of the user.

Further, the presentation of a pseudo "feeling of weight" by presentation of the information of the sense of vision/sound/sense of touch can be similarly occurred in the system based on HapticJacket described separately.

Next, the feedback described with reference to FIGS. 24 to 27 will be supplemented. In the feedback described with reference to FIGS. 24 to 27, basically, control is performed such that up, down, left, and right movement of a bright point of the controller held by the user and movement of the virtual ball (virtual manipulation object) in the screen coincide with each other. However, in a case in which the virtual ball goes over the virtual object (a rough surface and a smooth surface in the above-described drawing), although the movement of the user is straight in the left and right direction, the ball is moved along the surface of the virtual object as illustrated in FIG. 24 to FIG. 27 without causing the movement of the ball to coincide with the movement of the user. When the ball enters or traces a convex surface, the haptic and audio feedbacks are given. With such control, the user is under an illusion that the movement of his/her arm but the trajectory of the virtual object in the screen is the trajectory of his/her hand and thus intuitively feels an uneven feeling of the virtual object.

In a case in which the user makes a trial while blocking his/her sense of vision, the uneven feeling is not obtained, and thus this is an example of cross-modal perception based on an interaction of the somesthetic sense, the sense of touch, and the sense of hearing centering on the sense of vision. By using such an effect, it is possible to cause the user to feel a pseudo "sense of force" (reaction force from a bulging surface).

In a similar system, when the virtual ball rolls on the uneven surface on which uneven patterns are repeatedly placed, similarly to the above example, the visual information is not caused to coincide with the movement of the controller of the user, and the pseudo feeling may be presented. Specifically, when the virtual ball goes over a step shape of an uneven surface, the movement of the ball in the lateral direction is delayed by a certain amount (even when the actual controller is displaced laterally, the ball is not displaced laterally), and thus a "feeling of snag" can be presented. After a certain amount of difference is given to both the displacements, both the displacements are caused to coincide with each other again, and thus accumulation of errors is prevented. Further, at this time, generating the haptic and audio feedbacks before and after the snag is also effective in presenting the pseudo "feeling of snag."

In a case in which the user makes a trial while blocking his/her sense of vision, the feeling of snag is not obtained, and thus this is an example of cross-modal perception based on an interaction of the somesthetic sense, the sense of touch, and the sense of hearing centering on the sense of vision. By using such an effect, it is possible to cause the user to feel a pseudo "sense of force" (reaction force from the uneven surface).

In a similar system, a difference between the rough surface and the smooth surface illustrated in FIG. 28 is expressed by the sense of touch, the sense of vision, and the sense of hearing. Specifically, in a case in which it traces the rough surface, a waveform obtained by deforming a pink noise is reproduced in accordance with the tracing speed, and thus it is possible to present a "feeling of friction" to the tracing in a pseudo manner. By the action of presenting the weight sense of touch, the user feels as if the user were tracing the rough surface like a harsh surface.

On the other hand, in a case in which it traces the smooth surface, the sense of touch and the sound are not presented for the tracing motion, and it is possible to present a touch of the "smooth" surface. However, since a feeling of touching the surface is not obtained if nothing is presented, it is possible to express a feeling of surface by returning pulse-like vibration based on a material at the beginning and end of invasion to the smooth surface.

The feeling of "rough" or "smooth" is greatly reinforced by a difference in a visual sense of roughness, and the pseudo reality is improved. Therefore, the feeling presentation is a cross modal effect based on an interaction of the sense of vision and the sense of touch.

As in the examples described above, particularly, by performing the presentation associated with the haptic feedback using the cross modal effect which is an illusion phenomenon occurring in the brain of the user, it is possible to significantly improve the implementation of the reality in the virtual space.

7. Supplement

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, in the above example, the vibration data is corrected in accordance with the pressure detected by a single pressure sensor 104. However, a plurality of pressure sensors 104 may be installed in the information processing device, and the vibration data may be corrected by a value of the pressure distribution obtained from a plurality of pressure sensors 104.

Further, in the above example, the vibration data is corrected in accordance with the pressing pressure or the wearing position of the wearable terminal 100. However, the human sensitivity to the vibration also changes depending on a contact area between the information processing device and the user 902. For example, since the contact area of the thumb on the information processing device is larger than that of the index finger, the user 902 is likely to feel the vibration. Therefore, in the information processing device grasped by the user 902 such as a smartphone or a game controller, the vibration data may be corrected in accordance with a way of holding the information processing device by the user 902. At this time, the information processing device grasped by the user 902 may include a detecting unit that detects the contact area between the user 902 and the information processing device. Further, the detecting unit may detect a finger of the user 902 which comes into contact with the information processing device. In the information processing device grasped by the user 902, the strength of vibration may be corrected in accordance with a pressure value of a part of the user 902 grasping the information processing device and/or information of the part of the user 902 (for example, information indicating that it is strongly grasped with the index finger and the middle finger, information indicating that it is strongly grasped with the ring finger and the little finger, or the like).

Further, in the above example, the wearing position of the wearable terminal 100 is detected using a magnetic wave, an ultrasonic wave, or a radio wave. However, the wearing position of the wearable terminal 100 may be explicitly input by the user 902.

Further, in the above example, the jacket type wearable terminal 100 receives the corrected vibration data from the game machine 200 and generates the vibration signal. However, the jacket type wearable terminal 100 may store the positions of a plurality of vibrating devices 102*a* to 102*f* and correct the vibration data received from the game machine 200 in association with the positions of a plurality of vibrating devices 102a to 102f. For example, the jacket type wearable terminal 100 may receive the vibration data from the game machine 200 and generate the corrected vibration data corrected to cause the vibrating devices 102c and 102f placed in the lower abdomen to strengthen the vibration. In other words, the corrected vibration data may be generated on the basis of the vibration data received from other information processing devices.

Further, the processing unit 106 and the corrected vibration data generating unit 108 may be implemented using a general-purpose processor. Further, a computer program for operating the processor as described above may be provided. Further, a storage medium having the program stored therein may be provided.

8. Conclusion

As described above, the information processing device according to the present disclosure corrects the vibration data in accordance with the state between the information processing device and the user 902. For example, the information processing device according to the present disclosure corrects the vibration data in accordance with the pressing pressure of the vibrating device 102 against the user 902. Accordingly, although the vibrating device 102 vibrates with the same physical vibration strength, the vibration experience strength of the user 902 is constant.

Further, the information processing device according to the present disclosure corrects the vibration data in accordance with the wearing position at which the information processing device is worn on the user 902 or the contact position at which the information processing device comes into contact with the user 902. Accordingly, the vibration experience strength of the user 902 is constant.

Additionally, the present technology may also be configured as below.

(1)

An information processing device, including:

a corrected vibration data generating unit configured to generate corrected vibration data obtained by correcting a strength of vibration data for a vibrating device including a vibrator on a basis of information provided from a detecting unit configured to detect a contact state of the vibrating device; and an vibration signal generating unit configured to generate a vibration signal from the corrected vibration data.

(2)

The information processing device according to (1), in which the detecting unit is a pressure sensor, and the corrected vibration data generating unit generates the corrected vibration data on a basis of information related to pressure detected by the pressure sensor.

(3)

The information processing device according to (2), in which the corrected vibration data generating unit generates the corrected vibration data to strengthen the strength of the vibration data in a case in which the pressure detected by the pressure sensor is weak.

(4)

The information processing device according to (1), in which the detecting unit is an acceleration sensor or a gyro sensor, and the corrected vibration data generating unit generates the corrected vibration data on a basis of information related to an acceleration, an angular speed, or an angular acceleration detected by the acceleration sensor or the gyro sensor.

(5)

The information processing device according to (4), in which the acceleration sensor or the gyro sensor detects secondary vibration caused by the information processing device not being pressed against a user, and the corrected vibration data generating unit generates the corrected vibration data to strengthen the strength of the vibration data in a case in which a magnitude of an acceleration, an angular speed, or an angular acceleration of the secondary vibration detected by the acceleration sensor or the gyro sensor is large.

(6)

The information processing device according to (2) or (3), in which the pressure sensor is placed between the vibrating device and a contact surface in which the information processing device comes into contact with the user.

(7)

The information processing device according to any one of (1) to (6), in which the vibrating device includes a case having an elliptical-shaped cross section, and the vibrator is placed on one of surfaces in which a tangent is perpendicular to a minor axis of the case.

(8)

The information processing device according to (7), in which the vibrating device is placed so that a surface of the case in which the vibrator is not placed is a contact surface with a user.

(9)

The information processing device according to any one of (1) to (8), in which the detecting unit further detects a wearing position of the vibrating device on a user, and the corrected vibration data generating unit generates the corrected vibration data on a basis of information related to the wearing position detected by the detecting unit.

(10)

The information processing device according to (9), in which the detecting unit detects the wearing position on a basis of a distance or a direction from a reference device serving as a reference.

(11)

The information processing device according to (9) or (10), in which the corrected vibration data generating unit corrects the vibration data to correct a frequency for vibrating the vibrator in accordance with the detected wearing position.

(12)

A method, including:

generating, by a processor, corrected vibration data obtained by correcting a strength of vibration data for a vibrating device including a vibrator on a basis of information provided from a detecting unit configured to detect a contact state of the vibrating device; and generating, by the processor, a vibration signal on a basis of the corrected vibration data.

(13)

A computer program causing a processor to generate corrected vibration data obtained by correcting a strength of vibration data for a vibrating device including a vibrator on a basis of information provided from a detecting unit configured to detect a contact state of the vibrating device, and generate a vibration signal on a basis of the corrected vibration data.

REFERENCE SIGNS LIST 100 wearable terminal
102 vibrating device
104 pressure sensor
106 processing unit
108 corrected vibration data generating unit
110 vibration signal generating unit
112 communication unit
114 position detecting sensor
116 storage unit
118 vibrator
200 game machine
202 communication unit
204 processing unit
206 corrected vibration data generating unit
300 virtual object
302 listener
400 case
402 opening portion
500 display device
600 head mounted type wearable device
700 vibration stand
702 vibrating plate
704 pedestal
706 elastic member
800 reference device

The invention claimed is:

1. An information processing device comprising:
a plurality of vibrating devices in different positions, each vibrating device of the plurality of vibrating devices including a vibrator; and
circuitry configured to
detect a wearing position of each vibrating device of the plurality of vibrating devices,
store the detected wearing position of each vibrating device,
generate corrected vibration data obtained by correcting a strength of vibration data for each vibrating device based on the stored wearing position of the vibrating device, and
generate a vibration signal from the corrected vibration data for each vibrating device.

2. The information processing device according to claim 1,
wherein the corrected vibration data is generated to increase the strength of the vibration data.

3. The information processing device according to claim 1,
wherein the corrected vibration data is generated to correct a frequency of the vibration data for vibrating the vibrator in accordance with the stored wearing position.

4. The information processing device according to claim 1,
wherein the information processing device comprises a jacket-type wearable terminal.

5. The information processing device according to claim 1,
wherein timing of haptic data generation related to the vibration data is controlled based on visual information of a display image.

6. An information processing method comprising:
detecting a wearing position of each vibrating device of the plurality of vibrating devices, each vibrating device including a vibrator;
storing the detected wearing position of each vibrating device;
generating corrected vibration data obtained by correcting a strength of vibration data for each vibrating device based on the stored wearing position of the vibrating device; and
generating a vibration signal from the corrected vibration data for each vibrating device.

7. A non-transitory computer-readable medium having embodied thereon a program, which when executed by an information processing device of a computer, causes the computer to execute a method, the method comprising:
detecting a wearing position of each vibrating device of the plurality of vibrating devices, each vibrating device including a vibrator;
storing the detected wearing position of each vibrating device;
generating corrected vibration data obtained by correcting a strength of vibration data for each vibrating device based on the stored wearing position of the vibrating device; and
generating a vibration signal from the corrected vibration data for each vibrating device.

8. The information processing device according to claim 1,
wherein the circuitry further generates the corrected vibration data for each vibrating device based on a detected pressing pressure of the vibrating device.

* * * * *